United States Patent
Sherman et al.

(10) Patent No.: US 10,859,894 B2
(45) Date of Patent: *Dec. 8, 2020

(54) TRANSFORMABLE ACCESSORY FOR A HANDHELD DIGITAL DEVICE

(71) Applicant: STIKBOX TECHNOLOGIES LTD, Milton Keynes (GB)

(72) Inventors: Yekutiel Sherman, Jerusalem (IL); Yachin Yarchi, Jerusalem (IL); Etay Amir, Petach Tikvah (IL); Omri Bar Zeev, Tel Aviv (IL)

(73) Assignee: STIKBOX TECHNOLOGIES LTD., Milton Keynes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,944

(22) Filed: Sep. 7, 2016

(65) Prior Publication Data

US 2016/0381192 A1 Dec. 29, 2016

Related U.S. Application Data

(63) Continuation-in-part of application No. 14/922,232, filed on Oct. 26, 2015, now Pat. No. 9,473,608, which
(Continued)

(51) Int. Cl.
*G03B 17/56* (2006.01)
*H04M 1/04* (2006.01)
*H04M 1/725* (2006.01)

(52) U.S. Cl.
CPC ......... *G03B 17/563* (2013.01); *G03B 17/566* (2013.01); *H04M 1/04* (2013.01); *H04M 1/7253* (2013.01)

(58) Field of Classification Search
CPC ........ H04M 1/21; H04M 1/04; H04M 1/7253; G03B 17/563; G03B 17/566; A45F 5/02; F16C 11/06; F16M 13/04
(Continued)

(56) References Cited

U.S. PATENT DOCUMENTS 7,706,673 B1 * 4/2010 Staudinger ......... F16M 11/2021
348/211.2
8,540,202 B2 * 9/2013 Hu ........................ F16M 11/10
108/6

(Continued)

FOREIGN PATENT DOCUMENTS

CN 204254189 * 4/2015
CN 204272200 U 4/2015

*Primary Examiner* — Yuwen Pan
*Assistant Examiner* — Angelica M Perez
(74) *Attorney, Agent, or Firm* — JMB Davis Ben-David

(57) ABSTRACT

A transformable accessory for a handheld digital device, functions both as a protective cover and as a selfie stick, the accessory having a mounting chassis adapted for securing to a digital device, and an accessory member connected to the mounting chassis. transformable between first and second operative positions, and having a plurality of interconnected elongate, prismatic elements. In the first operative position the prismatic elements are in a side by side, coplanar formation extending across the rear of the mounting chassis cooperating therewith as a protective cover for the digital device. In the second operative position, the prismatic elements may be extended so as to form a rod which cooperates with the mounting chassis such that the combination of the rod and the mounting chassis become a selfie stick.

19 Claims, 19 Drawing Sheets

Related U.S. Application Data is a continuation-in-part of application No. 14/741,485, filed on Jun. 17, 2015, now abandoned.

(60) Provisional application No. 62/163,415, filed on May 19, 2015.

(58) Field of Classification Search
USPC .................................................. 455/575.1
See application file for complete search history.

(56) References Cited

U.S. PATENT DOCUMENTS

| | | | |
|---|---|---|---|
| 9,301,584 B2 | 4/2016 | Butts | |
| 9,360,153 B2 | 6/2016 | Huang | |
| 9,386,832 B2* | 7/2016 | Elgan | A45C 11/00 |
| 9,473,190 B1* | 10/2016 | Sandlofer | G03B 17/563 |
| 2004/0223752 A1 | 11/2004 | Ghanouni | |
| 2007/0053680 A1 | 3/2007 | Fromm | |
| 2007/0177866 A1 | 8/2007 | Fujioto | |
| 2015/0029352 A1 | 1/2015 | Burciaga | |
| 2016/0070156 A1* | 3/2016 | Alster | G03B 17/563 |
| | | | 396/424 |
| 2017/0220068 A1* | 8/2017 | Youlios | G06F 1/1628 |
| 2017/0363935 A1* | 12/2017 | Zimmermann | G03B 17/561 |

* cited by examiner

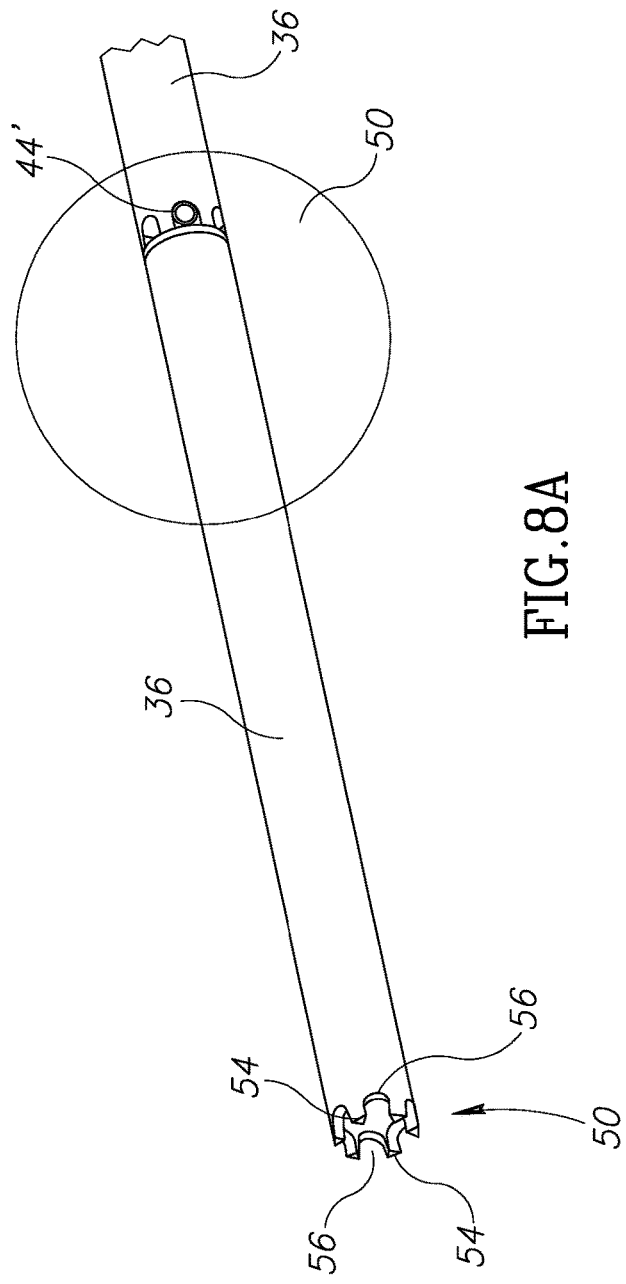
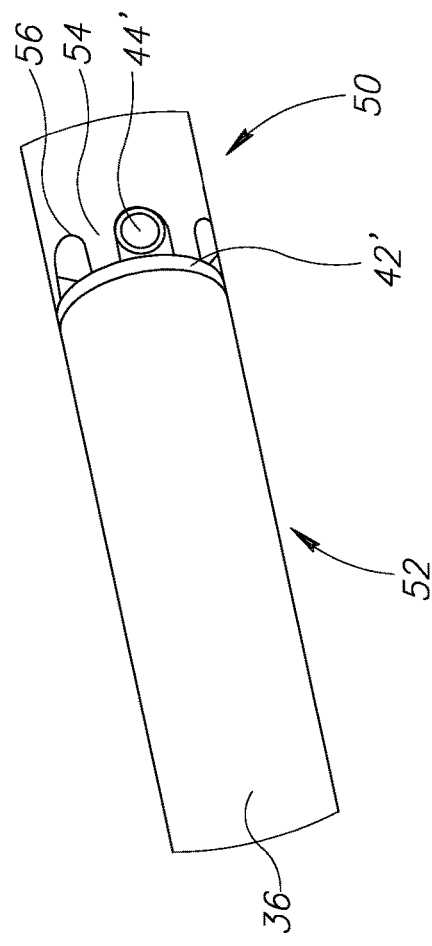
FIG.8A
FIG.8B

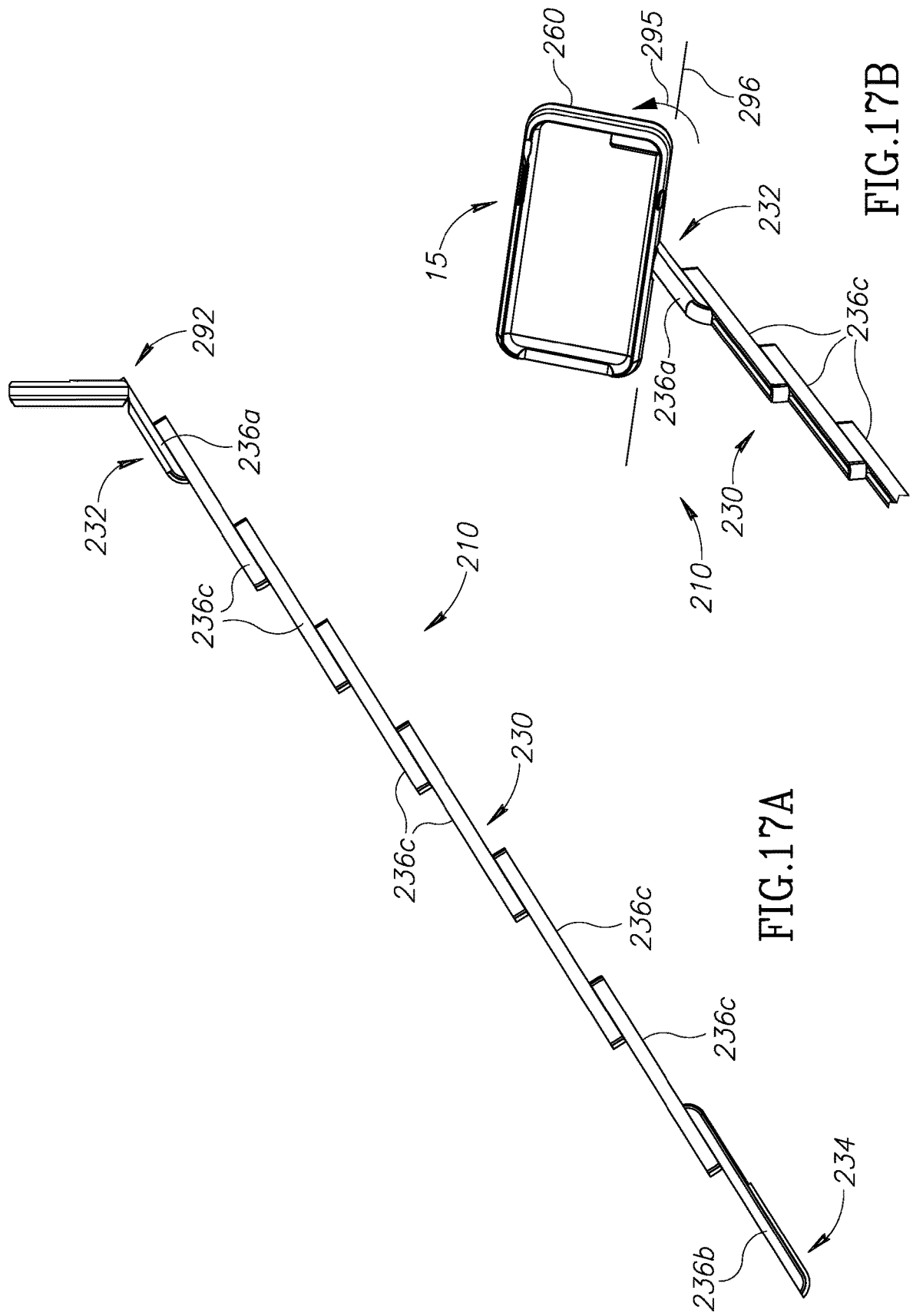

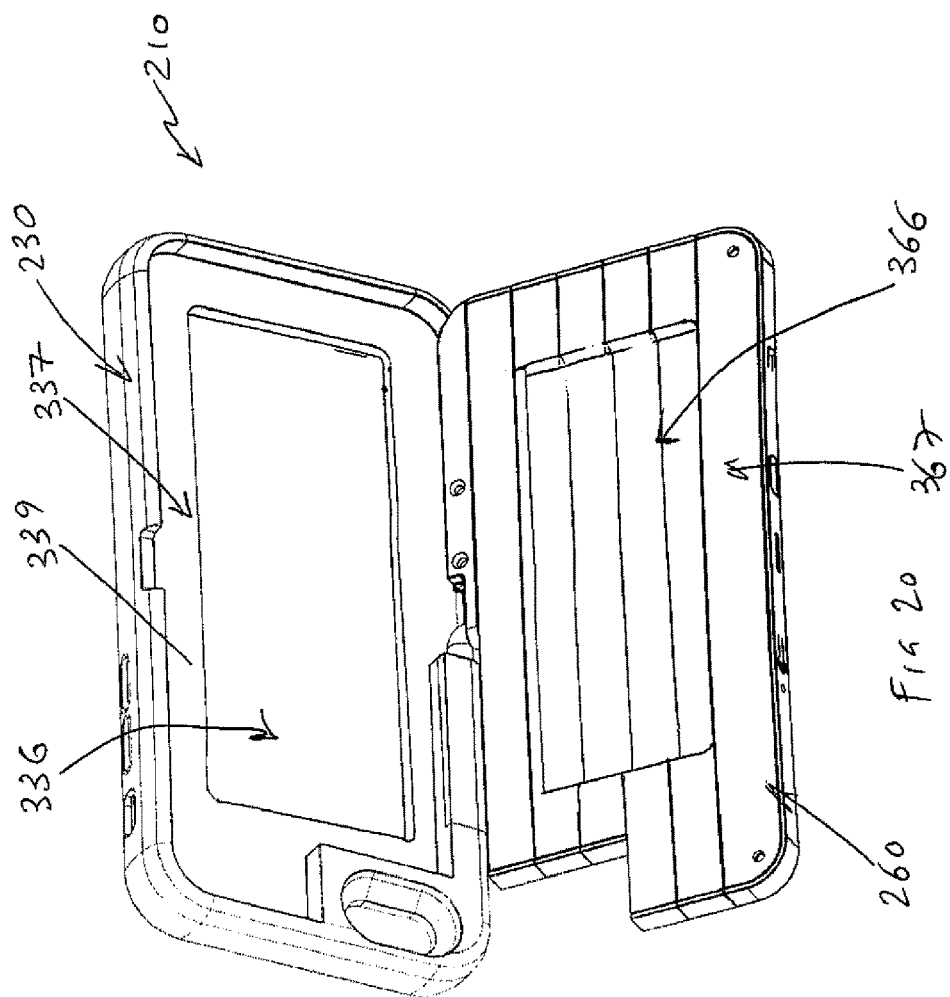
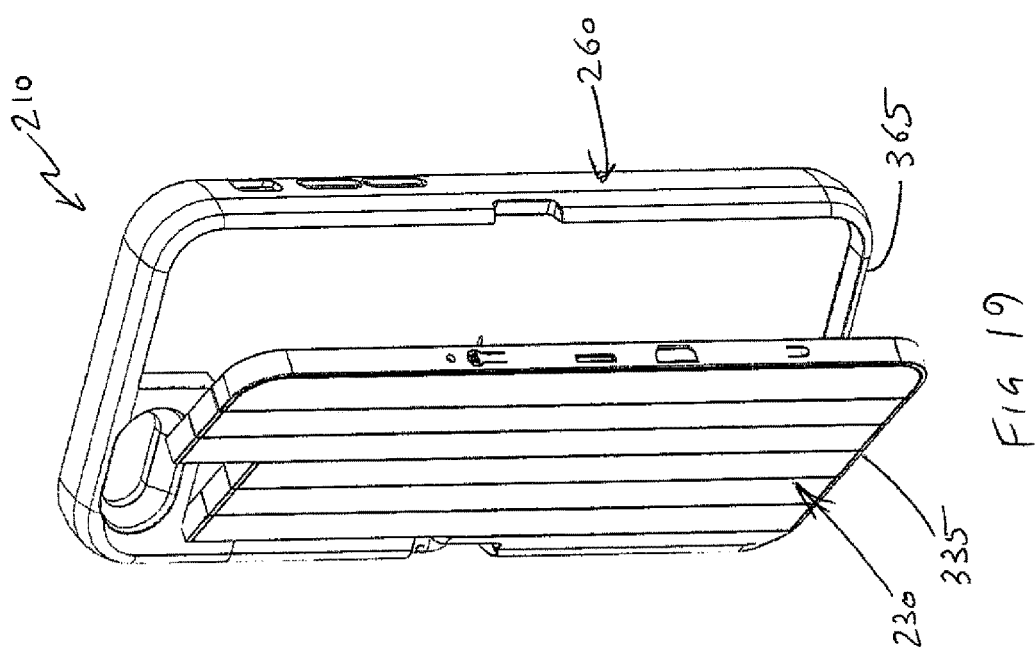

TRANSFORMABLE ACCESSORY FOR A HANDHELD DIGITAL DEVICE

CROSS REFERENCE TO RELATED APPLICATIONS

This is a Continuation-in-Part of U.S. patent application Ser. No. 14/922,232, filed Oct. 26, 2015, which is a Continuation-in-Part of U.S. patent application Ser. No. 14/741,485, filed Jun. 17, 2015, which claims the benefit of U.S. Provisional Patent Application No. 62/163,415, filed on May 19, 2015, all of which are incorporated by reference herein in their entirety.

FIELD OF THE INVENTION

The present invention relates to accessories for handheld digital devices.

BACKGROUND OF THE INVENTION

Among accessories for digital devices are protective cases for mobile phones. They typically include one or two layers of protective plastic/rubber and are fashioned to encase the rear and sides of the phone, thereby to prevent it from being damaged by being dropped or otherwise mechanically impacted. While such cases add bulk and cost to the phone, these factors are outweighed due to their use in preventing damage to an item which is relatively expensive and inconvenient to replace.

More recently, with the advent of high quality digital photography on mobile phones and the widespread internet connectivity of these devices, it has become commonplace for these devices to be used for self-photography, pictures being taken in this manner often then being shared with others or otherwise uploaded to social networking sites on the internet.

A disadvantage of self-photography by use of mobile phones is that the range at which one can hold the phone is limited by the length of the user's arm, such that the resulting picture loses much of the perspective that would normally be present in a convention picture taken by a third party (i.e. someone who is not in the picture).

Furthermore, there are many situations in which the person taking a photograph of scenery or wildlife, for example, would like to take a photograph from somewhat closer to the object being photographed, but is unable to do so as he is limited by the device being held literally at arm's length. This is particularly a problem when taking a photograph with a mobile phone, as phones often do not normally have an optical zoom capability, but a digital zoom. When the digital zoom is used, it increases the graininess of the resulting image, such that it is of poorer quality than desired.

In an effort to solve this problem, a further accessory, the so-called 'selfie stick' has been developed. A selfie stick enables a user to support a mobile phone at a greater distance from him- or herself than would otherwise be possible without the use of the stick. A selfie stick is composed of two main components, namely, an extendable rod and a mount which is attachable to an end of the rod. The mount, which in its simplest configuration is an adjustable clamp, attaches across the back and sides of the phone, and, when attached to the selfie stick rod enables use of the phone when held by a free end of the rod. Early range extender sticks, intended for use with photographic equipment which does not necessarily include mobile phones are described, at least in part, in US Patent Publications Nos. 2004/0223752 and 2007/0177866.

However, one of the well-known problems of selfie sticks is that they are bulky to carry around and thus inconvenient.

US Patent Publication No. 2007/0053680 discloses a telescopically extendible grip for a camera which represents an approach which could be useful in mitigating the bulkiness of selfie sticks, although the described 'grip for a camera' still represents an article which must be carried in addition to the camera in order to be used. Having such an additional item is an additional item to remember, or potentially forget and lose.

US Patent Publication No. US 2015/0029352 entitled Collapsible Cell Phone Boom Arm is directed to an extendible boom arm which is attached to a cell phone casing. In concept, this is similar to the ExtendaPic iPhone 5/5s Case, shown at http://www.extendapic.com/.

SUMMARY OF THE INVENTION

There is provided a transformable accessory for a handheld digital device, functioning both as a protective cover and as a selfie stick, the accessory having a mounting chassis adapted for securing to a digital device, and an accessory member connected to the mounting chassis transformable between first and second operative positions, having a plurality of interconnected elongate, prismatic elements.

In the first operative position the plurality of interconnected elongate, prismatic elements are locked in a side by side, coplanar formation thereby to extend across the rear of the mounting chassis so as to cooperate therewith as a protective cover for the digital device. In the second operative position, the plurality of interconnected elongate, prismatic elements may be extended so as to form a rod which cooperates with the mounting chassis such that the combination of the rod and the mounting chassis are a selfie stick for the digital device, the rod having a first end connected to the mounting chassis and a second, free end.

Additionally, the plurality of interconnected elongate, prismatic elements are foldable with respect to one another.

Further, each of the plurality of interconnected elongate prismatic elements is adapted for an axial sliding motion along at least one other adjacent prismatic element, the axial sliding motion in a first direction being required so as to achieve transformation of the accessory member into the rod, and further, in a second direction opposite to the first direction, so as to achieve transformation of the rod back into the cover portion.

Additionally, each of the plurality of interconnected elongate, prismatic elements is a linear element having a longitudinal axis, Further, the plurality of interconnected elongate, prismatic elements includes a first end element terminating in the first end for engaging the digital device; a second end element terminating in the second, free end for being held in the hand of a user; and a plurality of interconnected intermediate elements connected to the first and the second end elements.

Additionally, each of the elongate, prismatic elements is adjacent to and operative for interlocking engagement with and side by side sliding along at least one other of the plurality of interconnected elongate, prismatic elements.

Further, each intermediate element is adjacent to and operative for interlocking engagement with and side by side sliding along two of the plurality of interconnected elongate, prismatic elements.

Additionally, each elongate, prismatic element includes a track configured to face laterally towards an adjacent elongate, prismatic element in a first direction; a link element formed on the opposite side of the elongate, prismatic element relative to the track so as to extend towards an adjacent elongate, prismatic element in a second direction, opposite to the first direction, wherein the link element of one elongate, prismatic element is adapted to engage the track of an adjacent element so as to be slidably movable therealong; and a stop element provided at the end of the track so as to prevent disconnection of the link element from the track of the adjacent element.

Further, the first end element is connected to the mounting chassis via a hinge arrangement having multiple degrees of freedom so as to facilitate a desired angular adjustment of the mounting chassis and the digital device relative to the accessory member.

Additionally, the hinge arrangement has at least two degrees of freedom.

Further, the accessory also includes a remotely located control for operating the digital device.

Additionally, the remotely located control is mounted at the second, free end of the rod.

Further, the mounting chassis includes an edge portion which engages and extends about the periphery of the digital device.

Additionally, the accessory member is connected to the mounting chassis via a hinge so as to be unitarily foldable with respect thereto.

Further, the accessory member may be partially folded about the hinge into an open position with respect to the mounting chassis so as to be usable as a free standing support for a digital device.

Additionally, the free standing support may be used so as to position the digital device in either a portrait or landscape orientation.

Further, the mounting chassis also includes an interior rear panel formed integrally with the edge portion and interposed between the accessory member and the rear of the digital device Additionally, at least one of the accessory member and the interior rear panel is formed so as to define a storage space therebetween when the accessory member is folded closed with respect to the interior rear panel.

BRIEF DESCRIPTION OF THE DRAWINGS

The present invention will be more fully understood and appreciated from the following detailed description taken in conjunction with the drawings in which:

FIG. 8A shows a single prismatic element connected to an adjoining prismatic element;

FIG. 8B is an enlarged view of the connection in FIG. 8A, illustrating a preferred anti-rotation locking mechanism provided thereat;

FIG. 17A is a further side view of the accessory as seen in FIG. 17A;

FIG. 17B is a front view of the accessory as seen in FIGS. 17A and 17B;

FIG. 19 is a pictorial view of the transformable accessory of FIGS. 12A-18B in use as a free standing support for a digital device in a portrait orientation; and FIG. 20 is an interior view of the transformable accessory of FIGS. 12A-19, but having therein one or more internal storage compartments.

DETAILED DESCRIPTION

Figure 1:
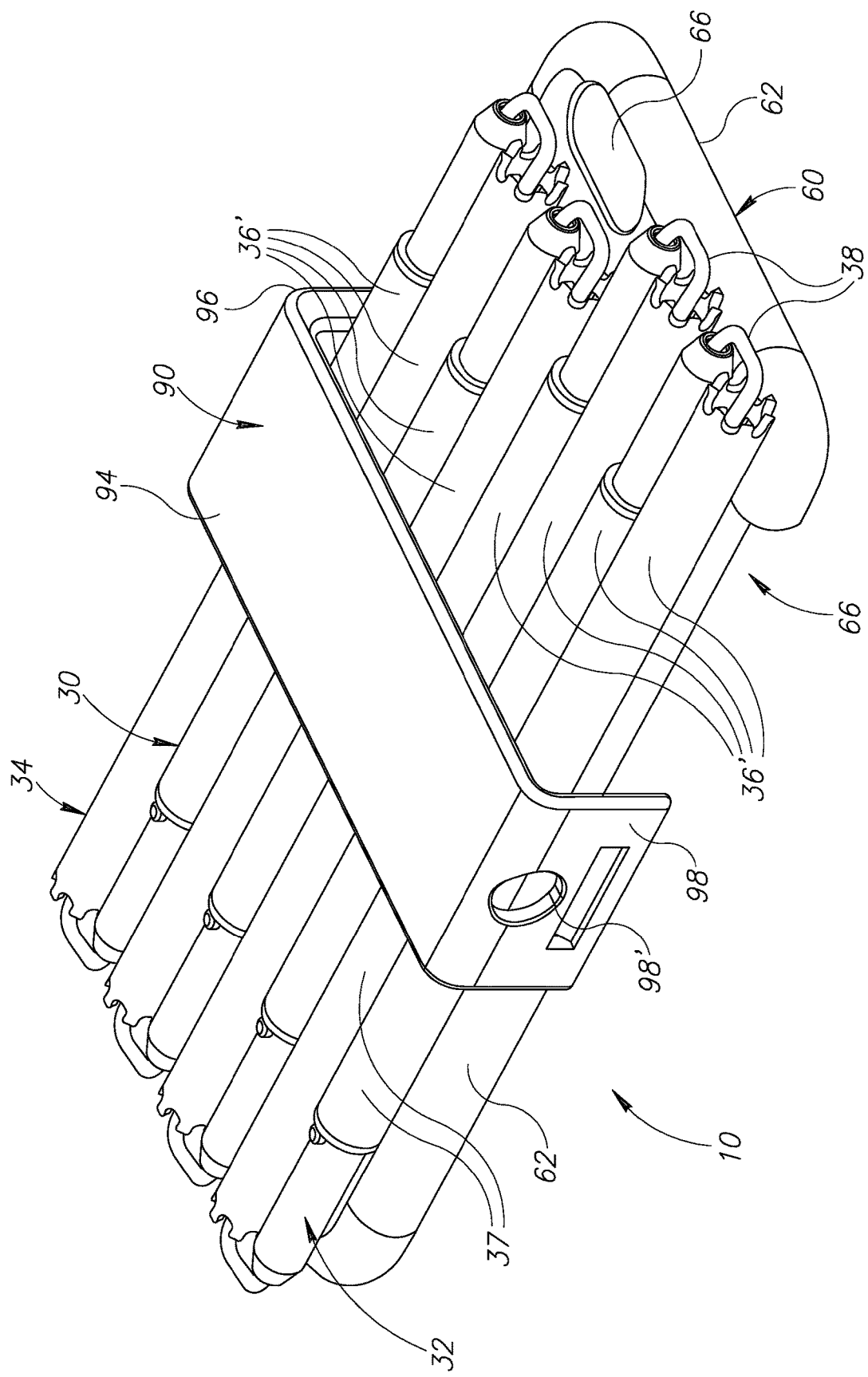
FIG. 1 is a rear isometric view of a transformable accessory for a handheld digital device, constructed in accordance with the present description and seen in a first operative position, as a protective cover for the digital device.

Referring initially to FIG. 1-5, there is described a transformable accessory 10 for a handheld digital device 12 (FIGS. 4A-5) such as a digital camera and/or video device or an audio recording device. Typically, the digital device combines all of these capabilities as well as transmission capabilities, such as found in a mobile phone, although the use of the accessory is not limited thereto.

The transformable accessory 10 includes a transformable accessory member, referenced generally 30, and a mounting chassis, referenced generally 60. In the present embodiment, there is also provided a dual purpose engagement member, referenced generally 90, which is operative both to assist in securing accessory member 30 in position when functioning as a protective cover, and also to support device 12 and mounting chassis 60 on accessory member 30 when functioning as the rod of a selfie stick.

As will be appreciated from the description below, accessory member 30 is transformable between first and second operative positions, and has a plurality of interconnected elongate, prismatic elements 36.

In its first operative position the plurality of interconnected elongate, prismatic elements 36 cooperate with mounting chassis 60 as a protective cover for the digital device; and in its second operative position the plurality of interconnected elongate, prismatic elements 36 extend into a rod formation so as to combine with mounting chassis 60 so as to function as a selfie stick for the digital device. It will thus be appreciated that accessory member 30 may be variously and interchangeably described below as cover or cover member 30 or selfie stick 30, depending on the context.

In the present embodiment, when accessory member 30 is used as a selfie stick rod (FIGS. 6A-7C), it connects at a first end 32 to the dual purpose engagement member 90, and may be held in the hand of a user, at the second, free end 34 (FIGS. 1, 2, 6A and 7A).

Figure 9A:
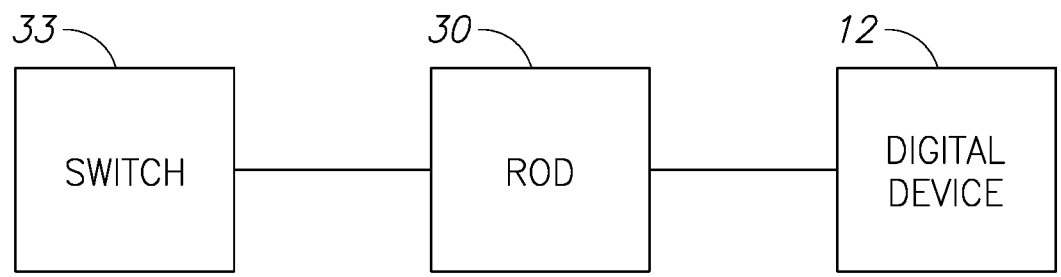
FIGS. 9A and 9B are block diagram illustrations of basic interactive operational components of the transformable accessory and a digital mobile communications device, wherein the device is operated via wired and wireless connections, respectively.
Figure 9B:
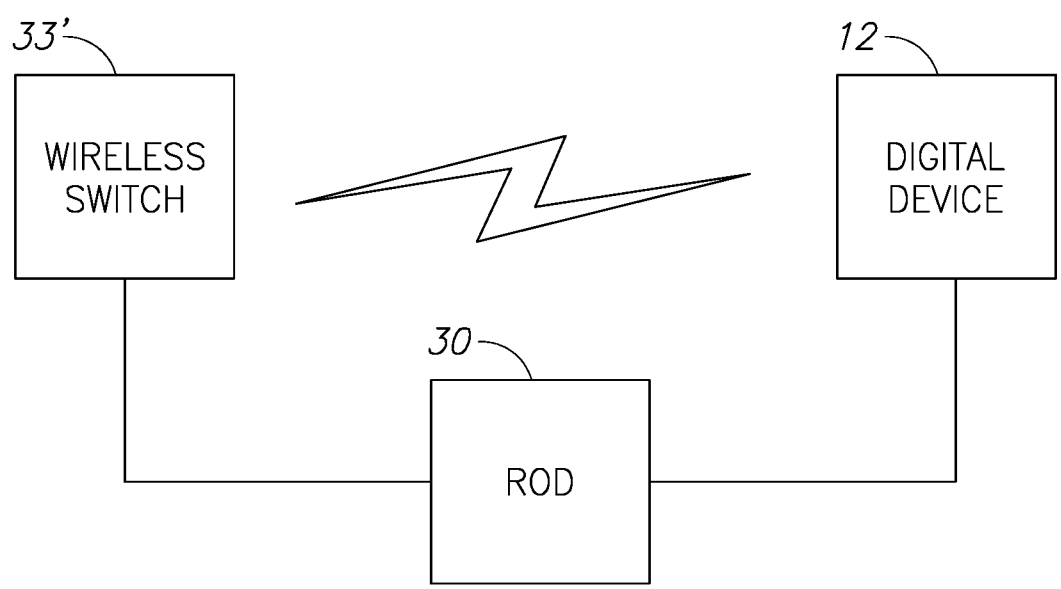

Referring now briefly to FIGS. 9A and 9B, it is seen that when transformable accessory 10 is used as a selfie stick, a suitable selector or switch 33 (FIG. 9A), connected to device 12 via a suitable wired connection, or a wireless switch 33' (FIG. 9B), such as a Bluetooth button or the like, is used to activate device 12. If switch 33 is a wired switch as depicted in FIG. 9A, then it is located on the second end 34 of the selfie stick rod 30, substantially as known in the art. However, if switch 33' is a wireless switch as depicted in FIG. 9B, it may be mounted on second end 34 of the selfie stick rod 30 held by the user, or alternatively it may be hand-carried separately.

In yet a further embodiment, the Bluetooth switch may be implemented as a Bluetooth function of a mobile device being carried by a pre-authorized additional person in the vicinity of the user.

When not in use as a selfie stick rod, the accessory member 30 is disconnected from the engagement member 90, collapsed or folded, as described below, and placed in a storage position on the back of the mounting chassis 60 after which it is secured by the dual purpose engagement member 90. As described below, accessory member 30 is manufactured so as to be strong, while nonetheless taking up minimal space, having a small diameter. Accordingly, it is stored so as to cover most of the rear panel 64 of mounting chassis 60 and so as to cooperate therewith to provide substantive mechanical protection to device 12.

The accessory member 30 is formed so as to be small and lightweight so as have minimal bulk, strong so as to enable minimal size and maximum length, and easily transformable from one operative position to another. To this end, in the present embodiment it is seen to be formed preferably of a plurality of thin diameter prismatic elements 36, each preferably no more than 8 mm in diameter. Preferably, they are produced by a 3-D printing process and formed of PLA and/or ABS mixed with a multi-directional carbon fiber. In accordance with a preferred embodiment, when transformable accessory 10 is manufactured for use in conjunction with a mobile phone such as a Samsung Galaxy S6® or an iPhone 6®, the length of the selfie stick rod 30 may be 80 cm or more.

In the present embodiment, a strong elastic cord 38 runs through the interior of the prismatic elements 36 so as permit compact, folded storage. However, once the engagement member 90 is opened and the prismatic elements 36 are released, the presence of the elastic cord imposes a tensile force therealong so that all of prismatic elements 36, free of any constricting forces, are brought into alignment and axially pulled together by the cord 38 into end-to-end mating connection with each other, so as to fully transform accessory member 30 into a selfie stick rod.

Figure 4A:
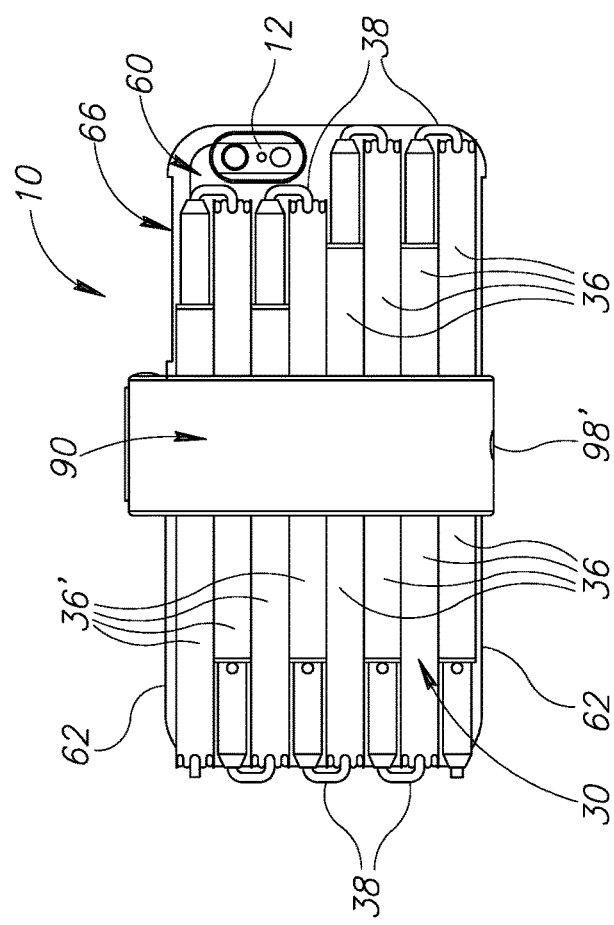
FIGS. 4A-4D show the accessory of FIG. 1 when mounted onto a digital device, depicted from the rear, top, side and bottom, respectively.
Figure 4D:
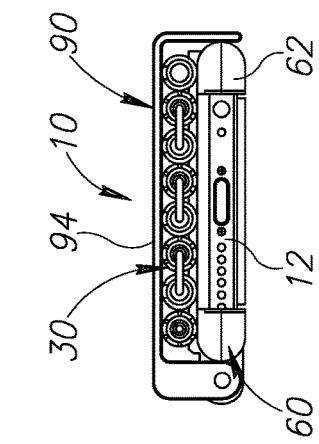
Figure 4C:
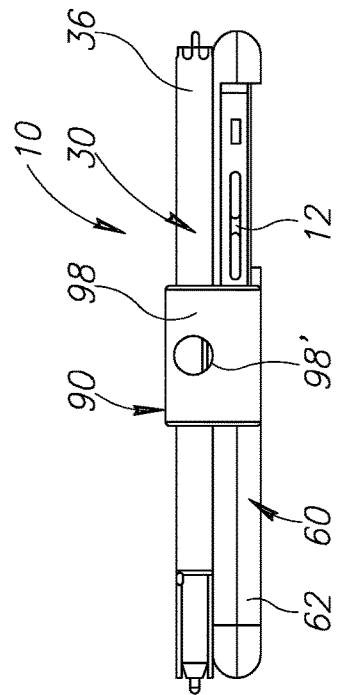
Figure 4B:
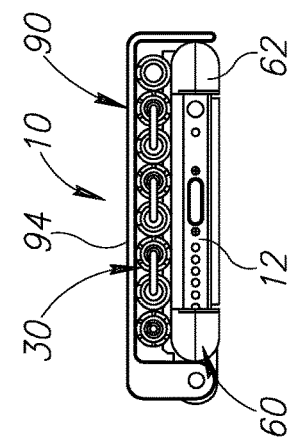
Figure 5:
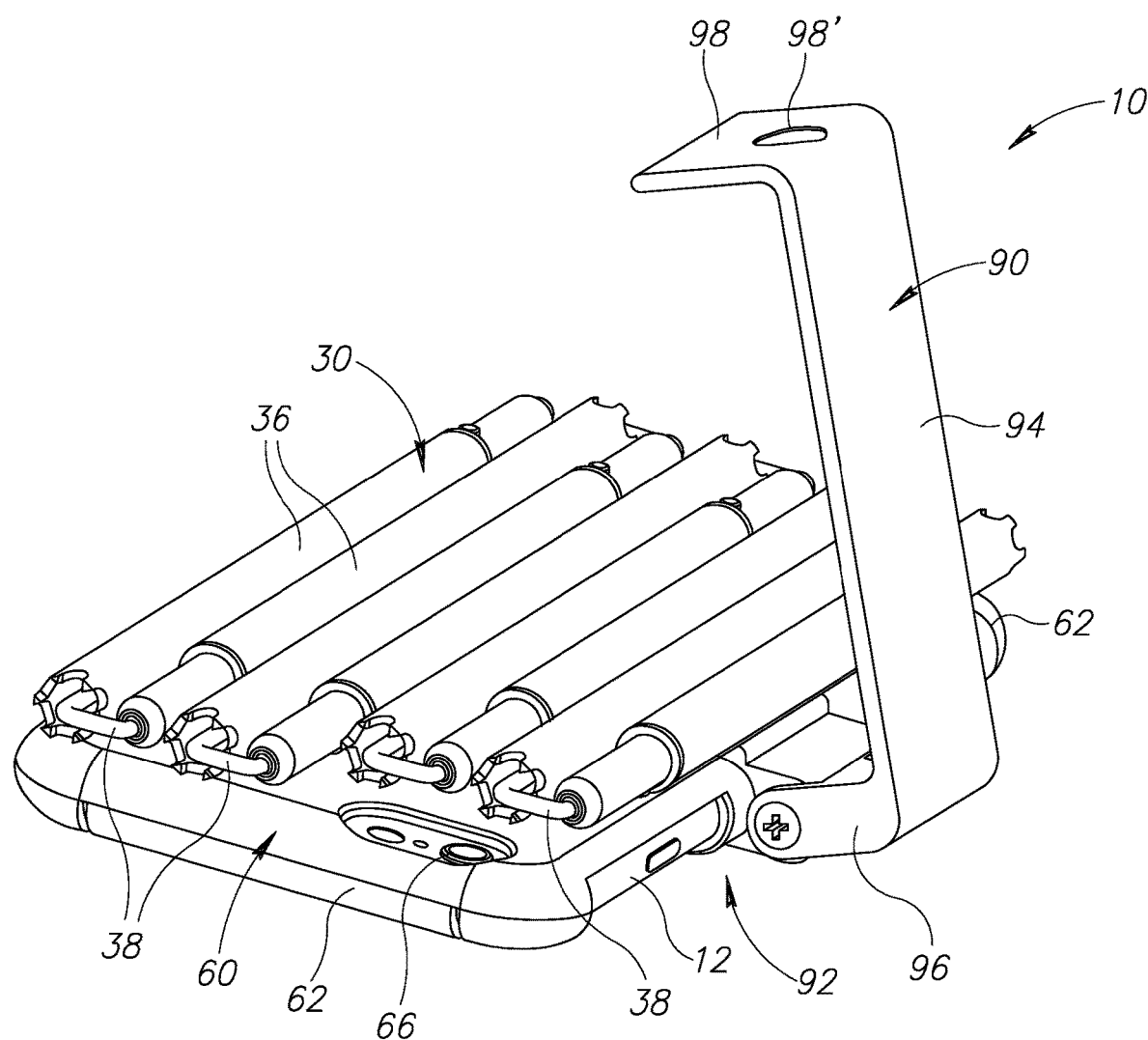
FIG. 5 shows the accessory as seen in FIG. 2, mounted onto a digital device.

Mobile phones have various features that must be accessible even when stored in a holder. These may include operating switches, view finders, earphone jacks, power ports and the like. Accordingly, if required, suitable openings 66 are formed in the mounting chassis 60, both on the perimeter edges 62 and on the rear panel 64 so as to enable convenient access to these features when the mounting chassis 60 is engaged with device 12. Furthermore, as illustrated in the drawings, the prismatic elements 36 are formed of specific sizes so that when they are in storage on the back of the mounting chassis 60, they do not obscure the above features, and allow convenient access thereto. Thus, as seen in FIGS. 1 and 4A, in the present example, prismatic elements 36' are shorter than the remaining prismatic elements 36.

The mounting chassis 60 is formed such that its perimeter edges 62 grip and protect the device 12 along its four edges, and such that the rear panel 64 overlies the rear of the device 12 in a manner which is generally similar to known mobile phone holders. Accordingly, other than showing these features clearly in the drawings, they are not specifically described again herein, being well known to one skilled in the art.

Figure 7A:
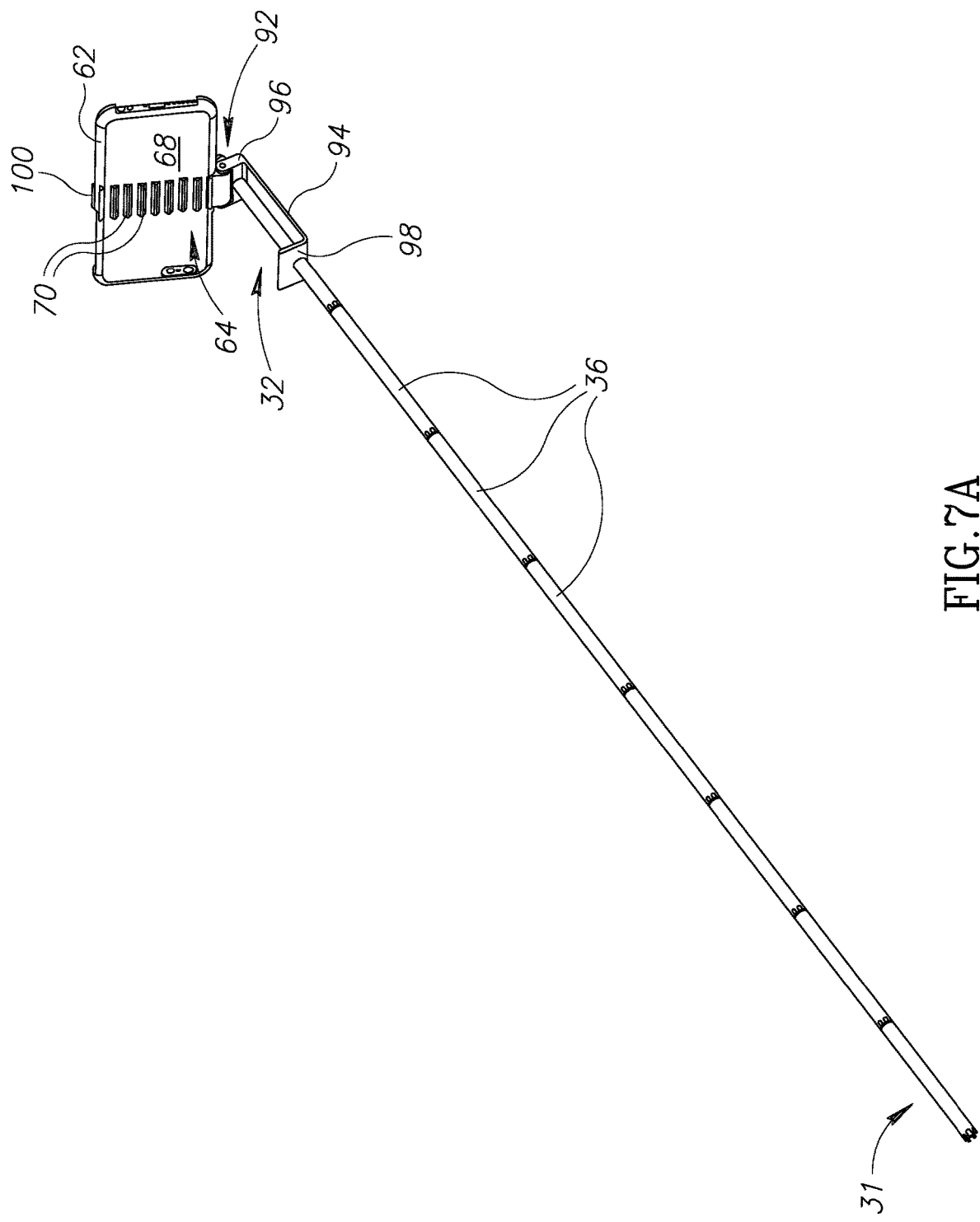
FIG. 7A is a view similar to that of FIG. 6A, in a further transformed position.
Figure 7C:
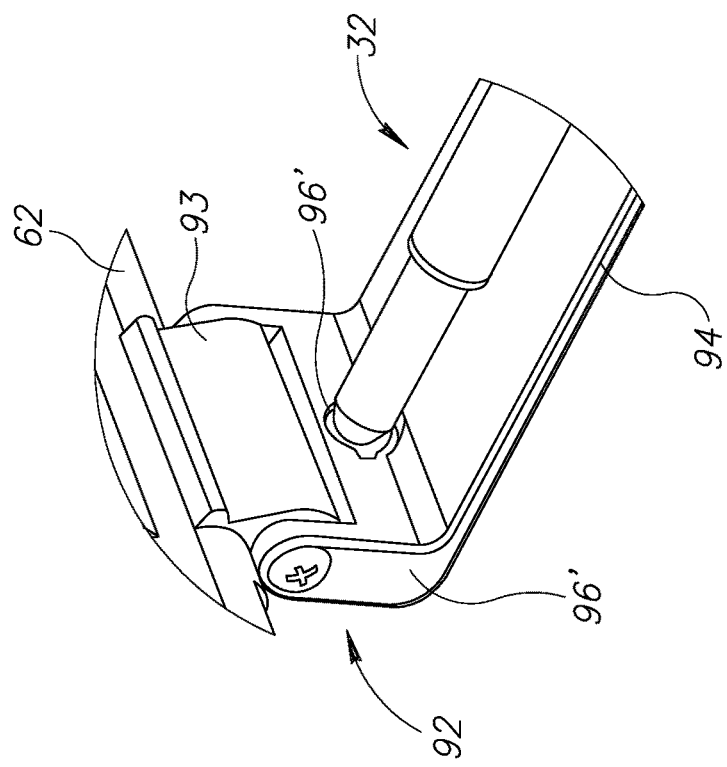
FIG. 7C shows an enlarged view of a portion of FIG. 7B.
Figure 7B:
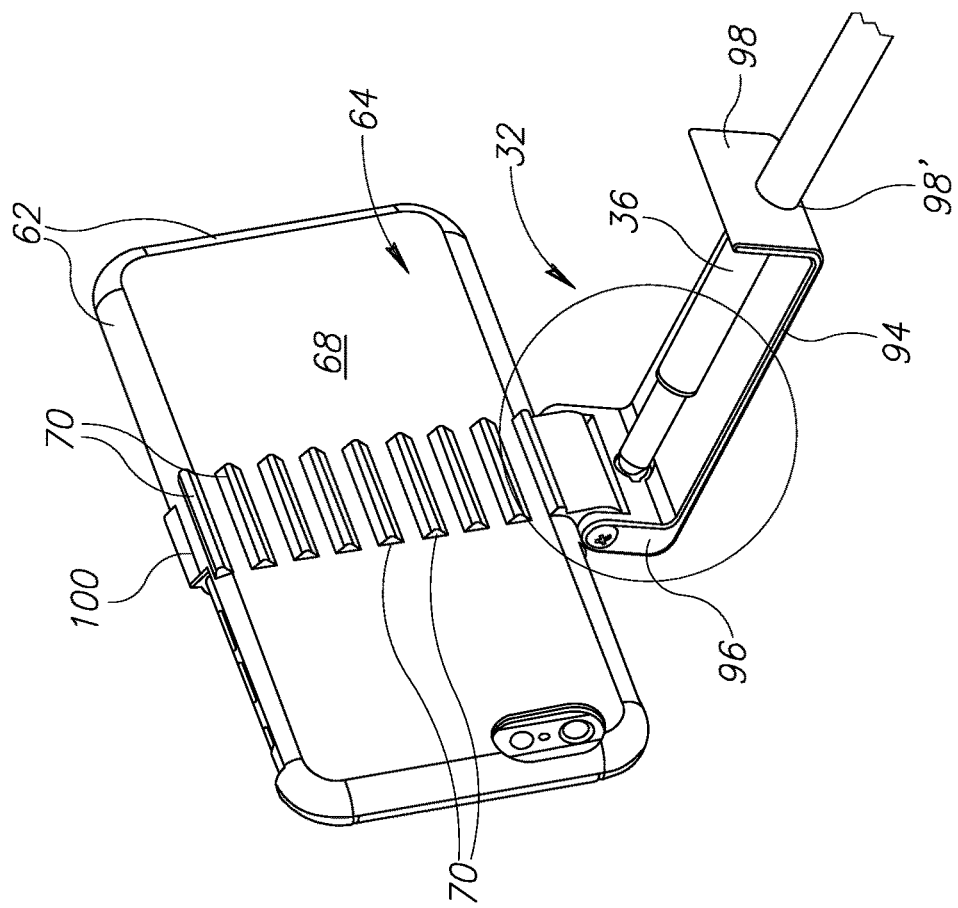
FIG. 7B shows the mounting of the mounting chassis and dual purpose engagement member of the accessory after transformation into a selfie stick.

However, as seen particularly in FIGS. 7A and 7B, the outward-facing side 68 of rear panel 64 is configured so as to engage prismatic elements 36 when transformed into their first operative position as a protective cover. According to one embodiment, there are provided positioning elements 70, illustrated herein as ridges, operative to receive the prismatic elements 36 therebetween, so as to prevent lateral movement relative to the rear panel 64, when in their first operative position as a protective cover.

Figure 10B:
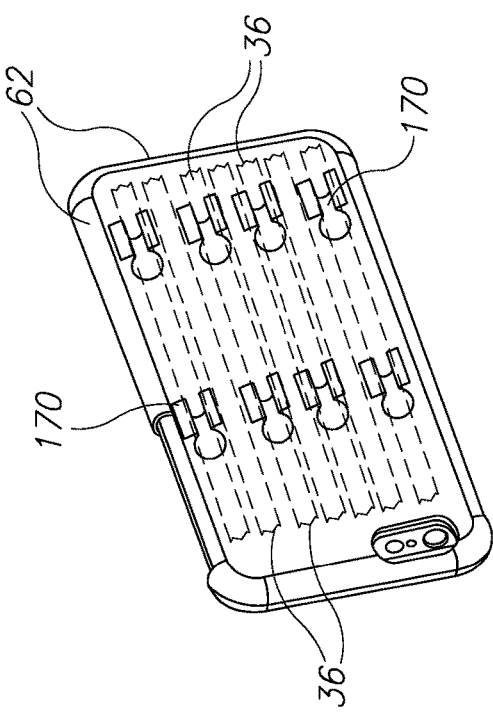
FIGS. 10A and 10B shows an interior rear panel of the mounting chassis as seen in FIGS. 7A and & 7B, but having clips provided thereon for securing the prismatic elements of the accessory member thereto.
Figure 10A:
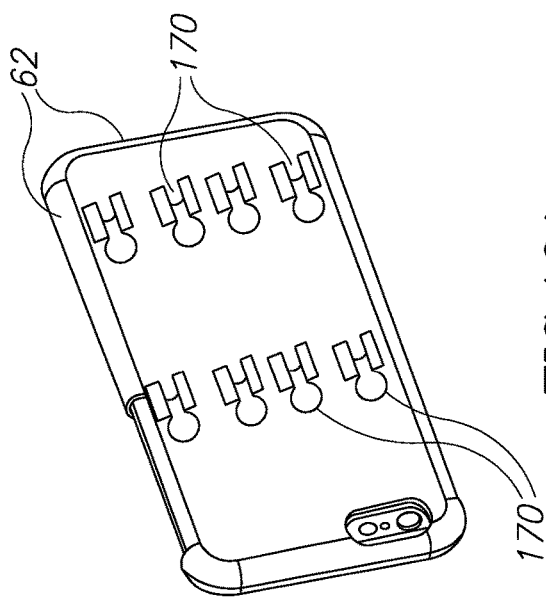

Referring briefly to FIGS. 10A and 10B, there may be provided fastening elements 170 such as clips or the like so as to grasp the prismatic elements 36 therebetween so as to positively fasten them to the rear side of mounting chassis 60. It will be appreciated that the schematically illustrated clips 170 represent merely one possible way of fastening the prismatic elements 36 to the rear of the mounting chassis 60 when cooperating therewith as a protective cover, and is intended to include any equivalent manner of doing the same.

Dual purpose engagement member 90 is connected to mounting chassis 60 by a suitable hinge construction 92. In the illustrated embodiment it has a generally elongated U-shaped clasp configuration, having a central portion 94 which is approximately equal to the width of the mounting chassis 60, and first and second end portions, respectively referenced 96 and 98. The engagement member 90 is formed so as to snugly contain the prismatic elements 36 of accessory member 30 against the rear side of the mounting chassis 60.

Each of the shorter end portions 96 and 98 has a specific task. First end portion 96 is not only connected by hinge 92 to a suitable flange portion 93 formed on the side of the mounting chassis 60, but it also has formed therein a first shaped opening 96'. Second end portion 98 is a free end, operative in securing accessory member 30 against the rear panel 64 of mounting chassis 60, as engagement member 90 is closed about hinge 92 and second end portion 98 is locked against a fastener element 100 formed integrally with mounting chassis 60. As the engagement member 90 and mounting chassis 60 are formed from high strength materials with a certain amount of elasticity, engagement member 90 is opened merely by grasping the free edge of second end portion 98 and flexing out outward and over the fastening element 100. Alternatively, any other suitable method of locking engagement member 90 about accessory member 30 may be employed.

Figure 6A:
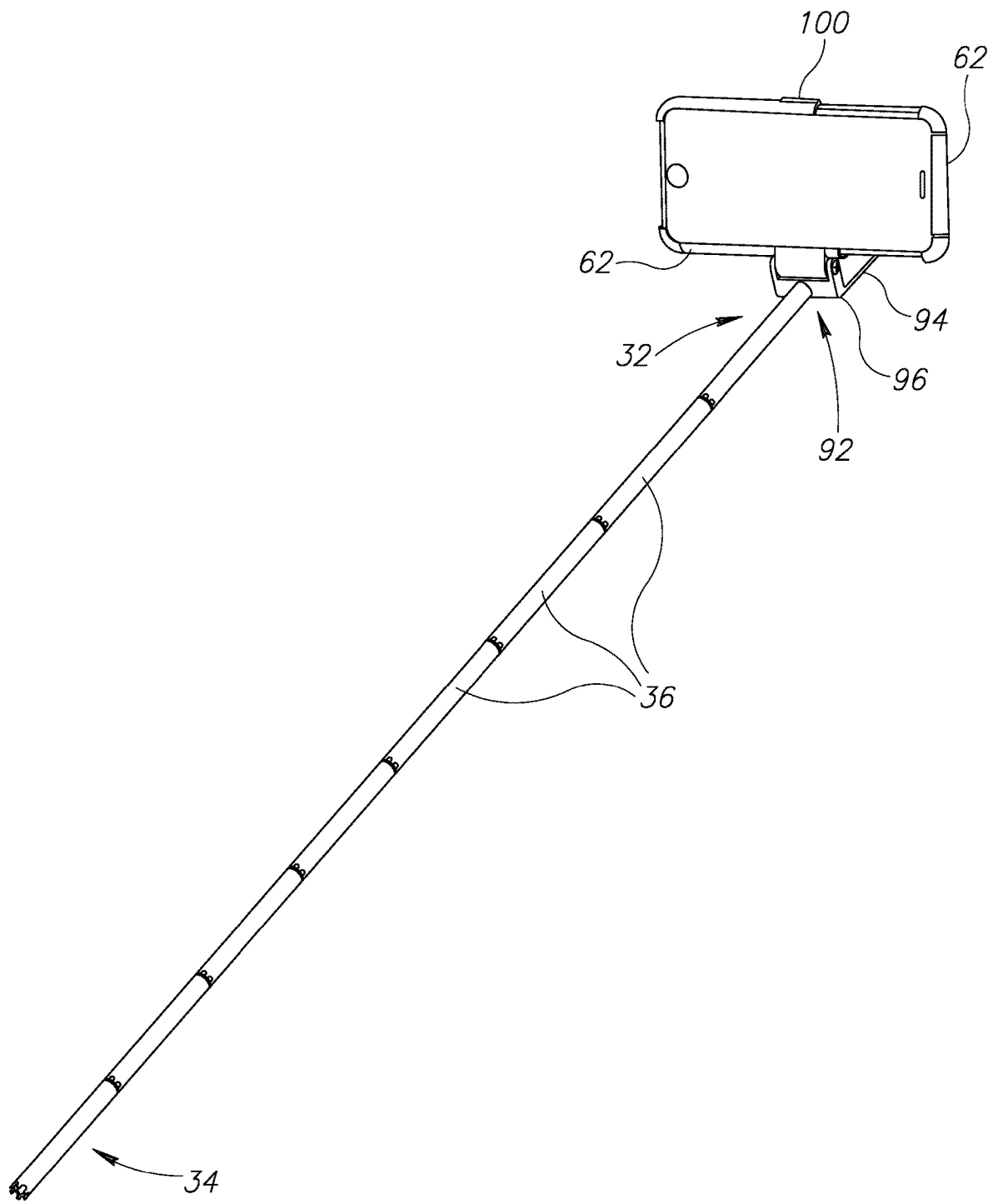
FIG. 6A shows the accessory shown in FIGS. 1-5 after transformation into a selfie stick, when supporting a digital device therein.
Figure 6C:
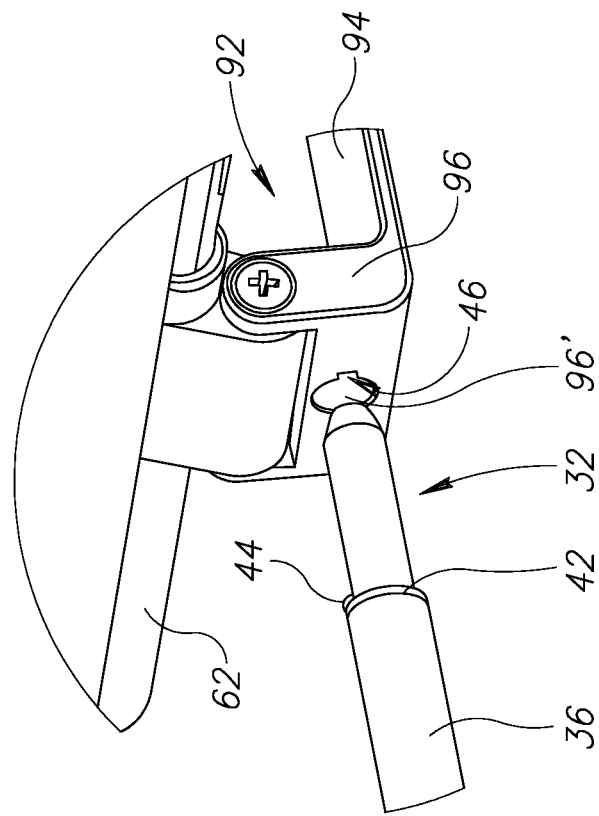
FIG. 6C shows an enlarged view of a portion of FIG. 6B.
Figure 6B:
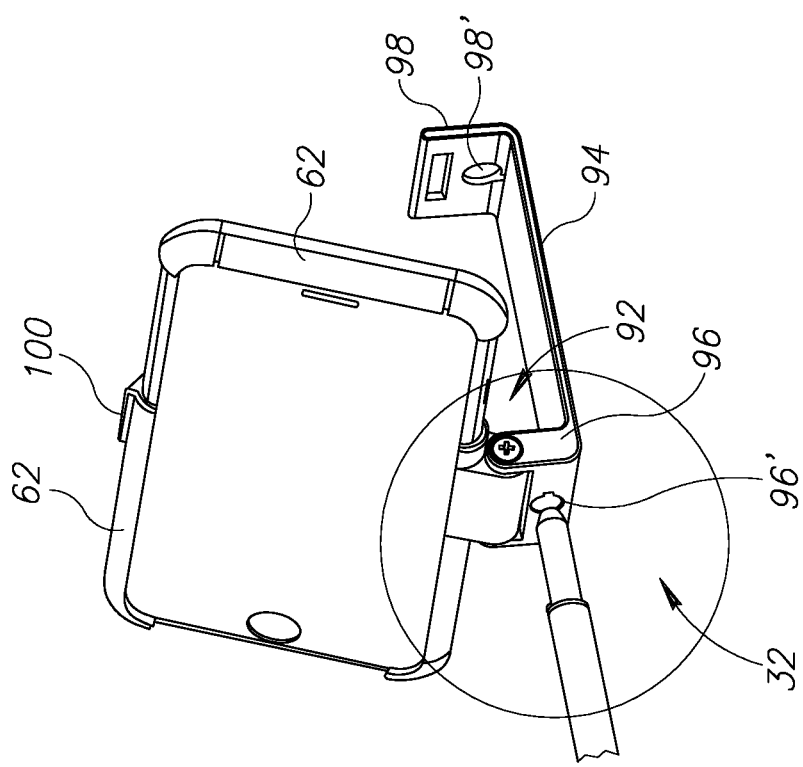
FIG. 6B shows the mounting of the mounting chassis and dual purpose engagement member of the accessory after transformation into a selfie stick.

First shaped opening 96' is formed so as to engage with a free end portion of the accessory member 30 when functioning as a selfie stick rod, as illustrated in FIGS. 6A-6C, so as to support the device 12. The free end portion of the selfie stick rod 30 terminates in a male locking member 40 adapted for insertion through first shaped opening 96' as seen in FIG. 6C. The radius of male locking member 40 is smaller than that of the remainder of prismatic element 36, thereby forming a limiting shoulder, seen at 42. As seen, the respective diameters of both the first shaped opening 96' and male locking member 40 are approximately equal, thereby to permit locking member 40 to pass smoothly through the opening 96' until limiting shoulder 42 abuts the edge opening 96'.

It is however necessary to prevent rotation of the device 12 about the selfie stick rod 30, thereby to ensure complete control of the position of device 12 when supported thereon. Accordingly, locking member 40 typically has formed thereon a radially oriented locking protrusion 44 immediately adjacent the limiting shoulder 42, adapted for insertion into locking engagement with a corresponding notch 46 formed adjacent to and communicating with shaped opening 96'. It will be appreciated that when protrusion 44 is engaged with notch 46, engagement member 90 and therefore mounting chassis 60 and device 12 are prevented from rotating about selfie stick rod 30.

In accordance with a preferred embodiment, first end portion 96 of the engagement member 90 supports the device merely by engagement of selfie stick rod 30 in first shaped opening 96'.

In an alternative embodiment, there may be provided a second shaped opening 98' in second end portion 98 of engagement member 90, wherein second shaped opening 98' is coaxially aligned with opening 96', but has a diameter which is approximately equal to that of prismatic element 36. When device 12 is mounted onto selfie stick rod 30 in this manner, as illustrated in FIGS. 7A-7C, prismatic element 36 passes completely through second opening 98' so as to extend across the gap between the second and first end portions of engagement member 90 and parallel to central portion 94. As seen, in this embodiment, male locking member 40 is also inserted through and locked with first shaped opening 96' in a manner similar to that shown and described above in conjunction with FIGS. 6A-6C, but from the interior of the clasp shaped engagement member 90. In this manner, selfie stick rod 30 is operative to support mounting chassis 60 and thus device 12 at two points, thus providing even greater stability, and thus also enabling the first engagement portion 96 to be made somewhat less thick.

As discussed above, it is desirable that when transformable accessory 10 is used as a selfie stick, no rotation should occur between device 12 and the selfie stick rod 30. Accordingly, this then requires that once the prismatic elements 36 are assembled, they too are locked in a position whereat no relative rotation with respect to their longitudinal axis is permitted.

Figure 2:
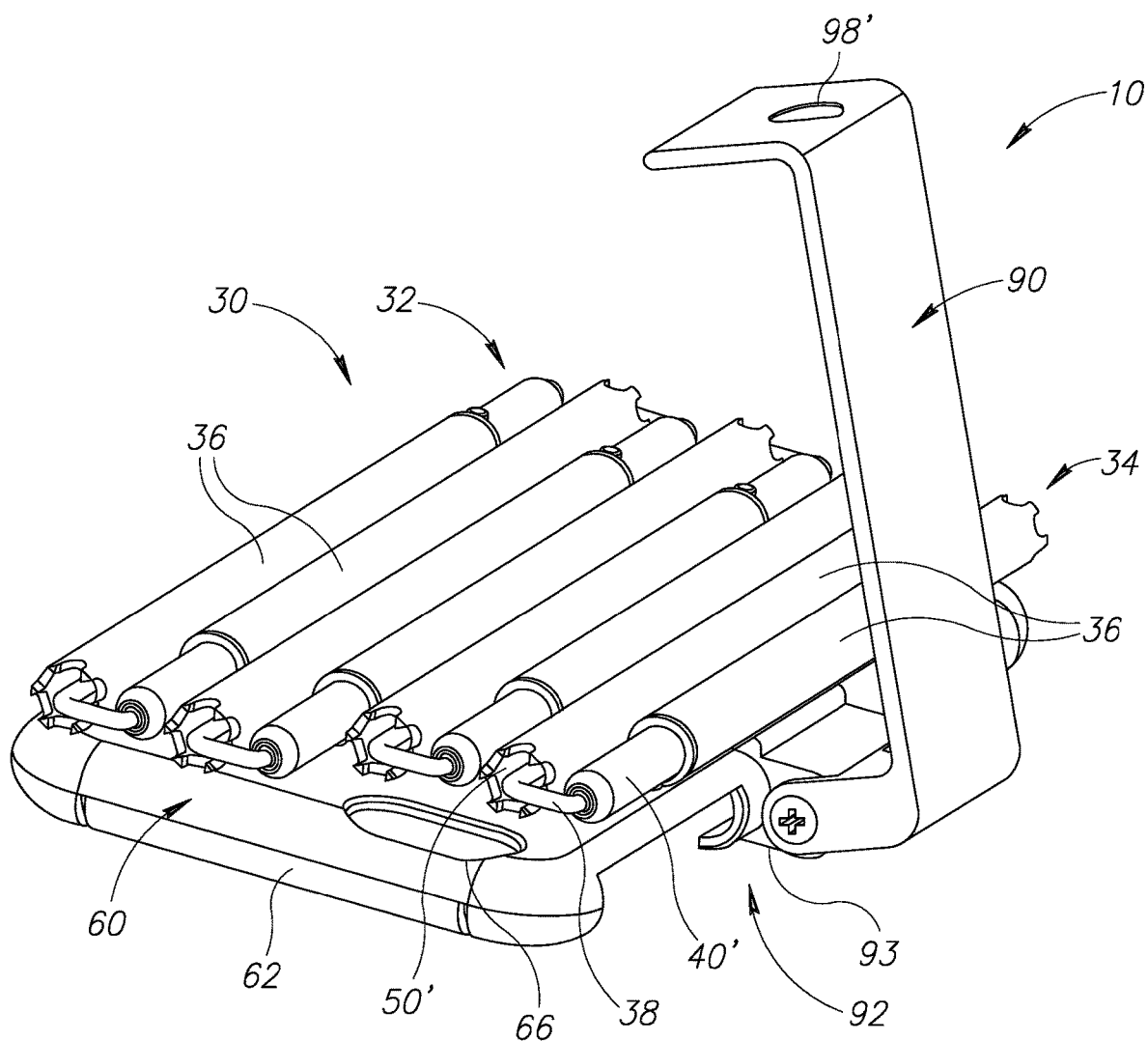
FIG. 2 is a rear isometric view of the accessory of FIG. 1 but in a partially open position.
Figure 3:
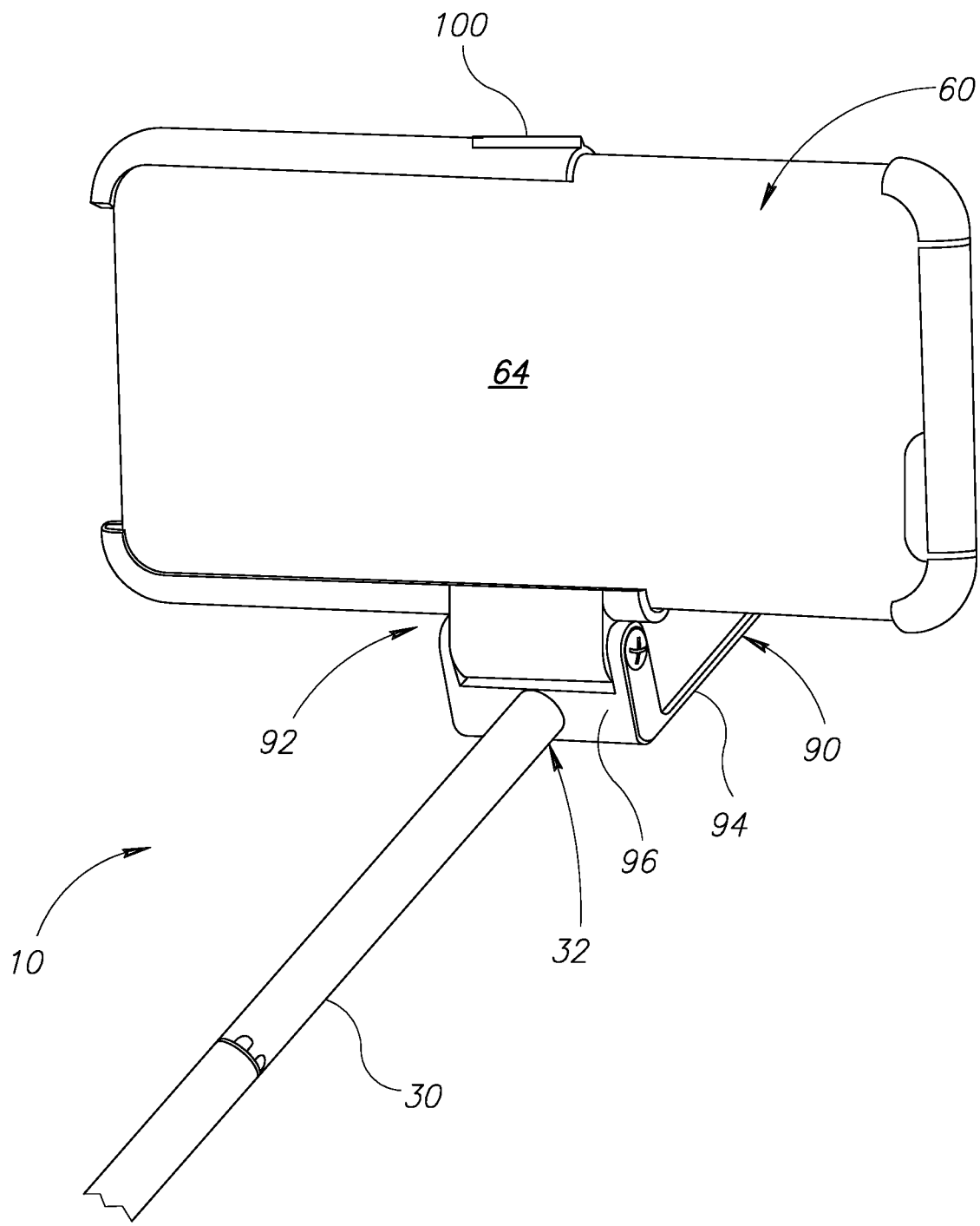
FIG. 3 is a front isometric view of the accessory of FIGS. 1 and 2, after transformation into a selfie stick.

Referring now to FIGS. 2, 8A and 8B, in order to prevent such undesired rotation from occurring, prismatic elements 36 are formed so as to interlock once they are engaged with each other. Each prismatic element 36, in the present embodiment, is provided with different first and second ends, respectively referenced 50 and 52.

First end 50 has formed thereat a series of crenations, or an alternating sequence of teeth 54 and notches 56. The second end 52 of each prismatic element 36 is provided with a male locking member 40' (FIG. 2) which is similar to male locking member 40, shown and described above in conjunction with FIG. 6C. Accordingly, locking member 40' is smaller than that of the remainder of prismatic element 36, thereby forming a limiting shoulder, seen at 42'. The respective diameters of both the end opening 50' (best seen in FIG. 2) of first end 50 and male locking member 40' (FIG. 2) are approximately equal, thereby to permit locking member 40' to pass smoothly through the opening 50' until limiting shoulder 42' abuts teeth 54.

In order to prevent relative rotation between the two mutually engaged prismatic elements 36, however, locking member 40' typically also has formed thereon a radially oriented locking protrusion 44' immediately adjacent the limiting shoulder 42', adapted for insertion into locking engagement with any of the notches 56. As described above, during transformation of accessory member 30 form a cover member to a selfie stick rod, adjacent prismatic elements 36 are straightened under the force of the elastic cord 38, and the adjacent first and second ends 50 and 52 of each pair of adjoining prismatic elements 36 are pulled together under the force of the cord 38. Therefore, all that is required so as to obtain full, non-rotational engagement of two adjoining r prismatic od elements 36, is that locking protrusion 44' of male locking member 40' engages any one of the notches 56 of the facing first end 50.

Figure 11:
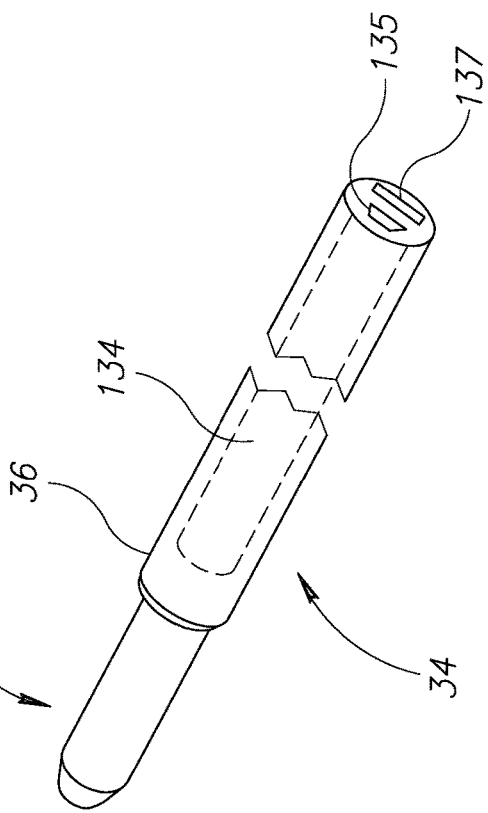
FIG. 11 is a schematic illustration of a free end element of the accessory member, housing therein a backup battery.

As described hereinabove, prismatic elements 36 are hollow, thereby being lightweight, and being suitable for a male-female interlocking mating when accessory member 30 is assembled and deployed as a selfie stick rod. However, in accordance with one embodiment, and referring now to FIG. 11, the prismatic element 36 which functions as the handle of selfie stick rod 30, may serve to house a rechargeable backup battery 134, suitably configured so as to fit within the hollow interior of the prismatic element 36. Operating generally as known for such backup batteries, the exposed end of battery 134 typically has a micro-USB port 135 so as to facilitate charging thereof, and a USB port 137 for charging an electrical device such as digital device 12.

Referring now to FIGS. 12A-12E, there is provided a transformable accessory 210 for a handheld digital device 12, constructed in accordance with an additional embodiment of the present description, illustrated as a protective cover for device 12. Accessory 210 is detailed herein, substantially only with regard to differences relative to accessory 10, shown and described hereinabove in conjunction with FIGS. 1-11.

Accessory 210 includes a mounting chassis 260 adapted for securing to the device 12 and a selectably transformable accessory member 230. Transformable accessory member 230 is operable in a first operative position, in cooperation with mounting chassis 260, as a protective cover for digital device 12, and in a second operative position, also in cooperation with mounting chassis 260, as a selfie stick rod.

Figure 13A:
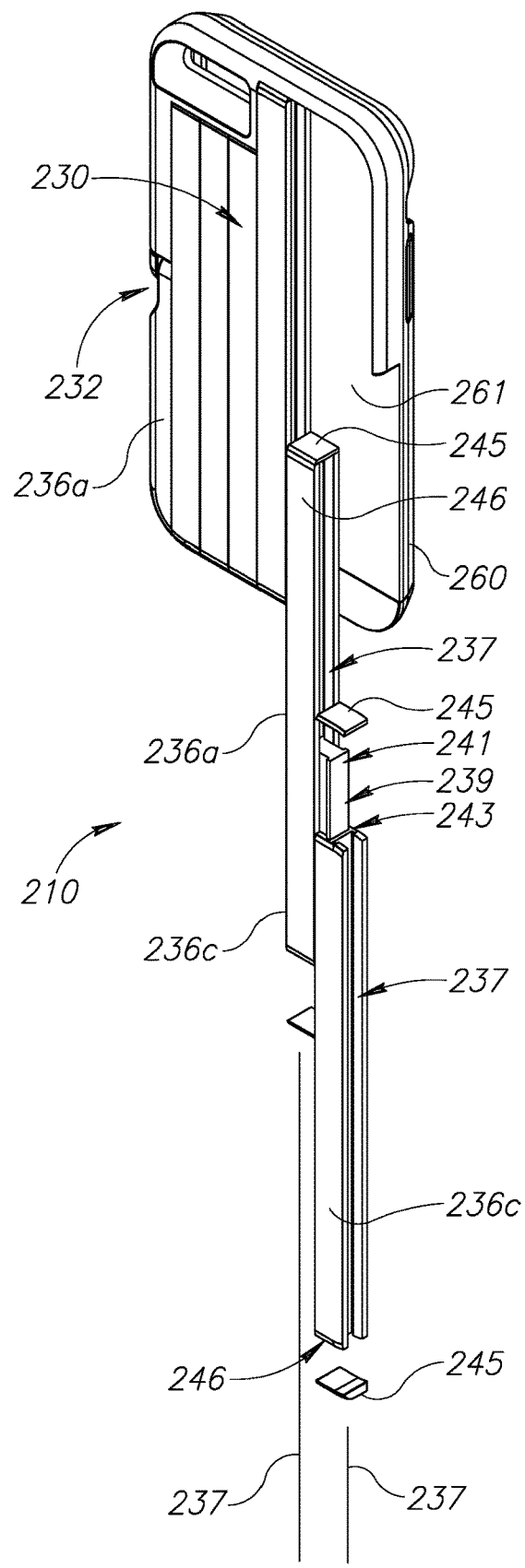
FIG. 13A is a partially exploded isometric rear view of the accessory of FIGS. 12A-12E, during transformation from a protective cover member into a selfie stick.
Figure 13B:
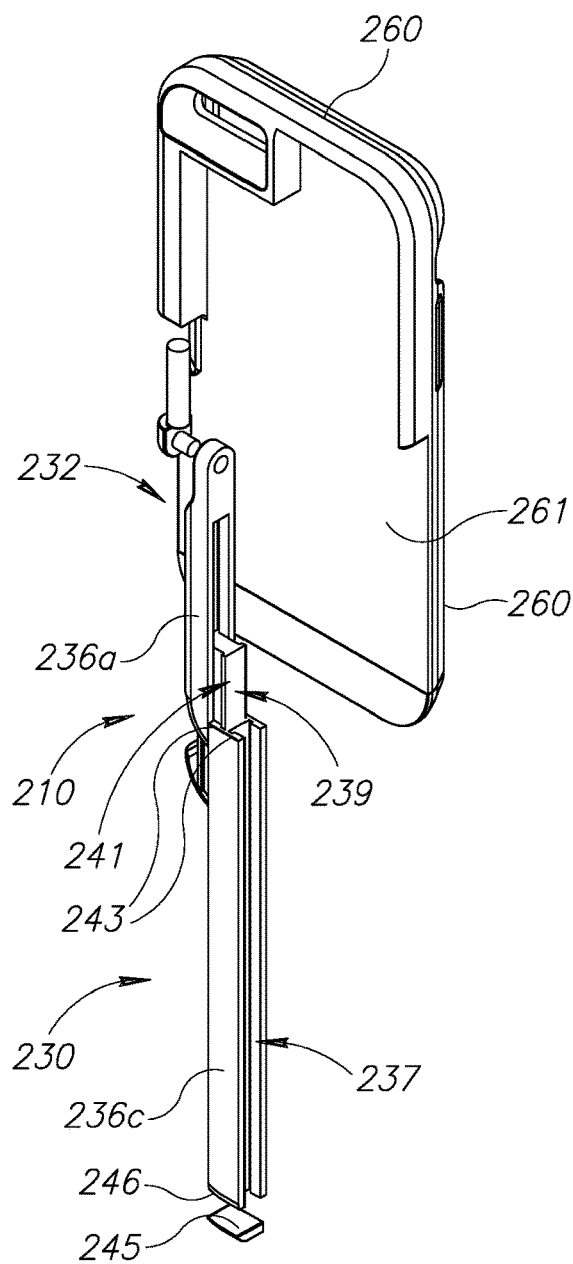
FIG. 13B is a yet further exploded view of that seen in FIG. 13A, wherein only a first end portion of the rod of the selfie stick is depicted, detailing in exploded view a hinge arrangement by which the rod connects to the mounting chassis of the accessory.
Figure 15:
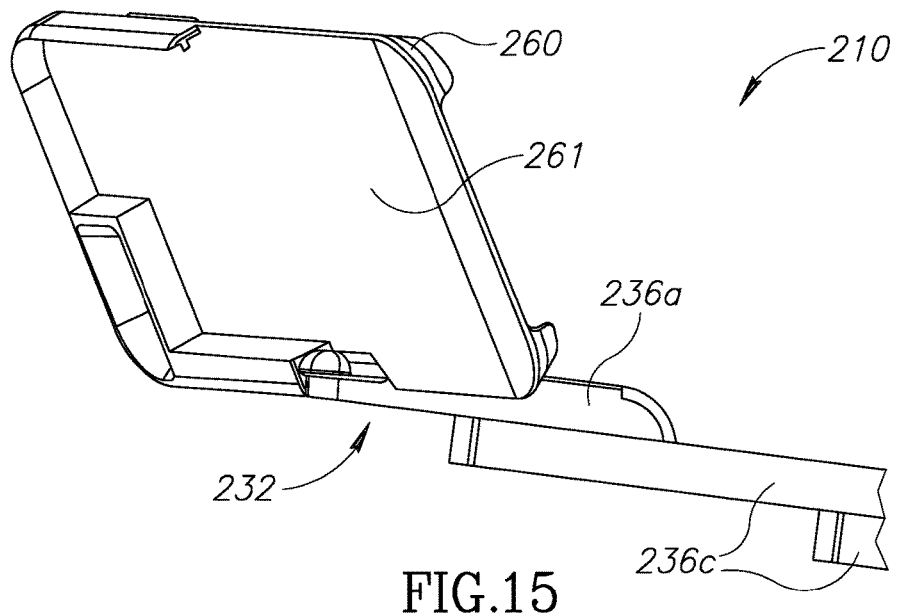
FIG. 15 is a rear perspective view of the transformable accessory, similar to FIG. 14B.

Referring now to FIGS. 13A and 13B, in a second operative position, accessory member 230 is adapted to transform into selfie stick rod 230 by extension in a direction transverse from the mounting chassis 260, whereby a first end 232 of the selfie stick rod 230 is adapted to support the device 12 and a second distal end 234 is adapted to be held in the hand of a user. Use of transformable accessory 210 as a selfie stick is depicted in FIG. 17A.

Figure 12A:
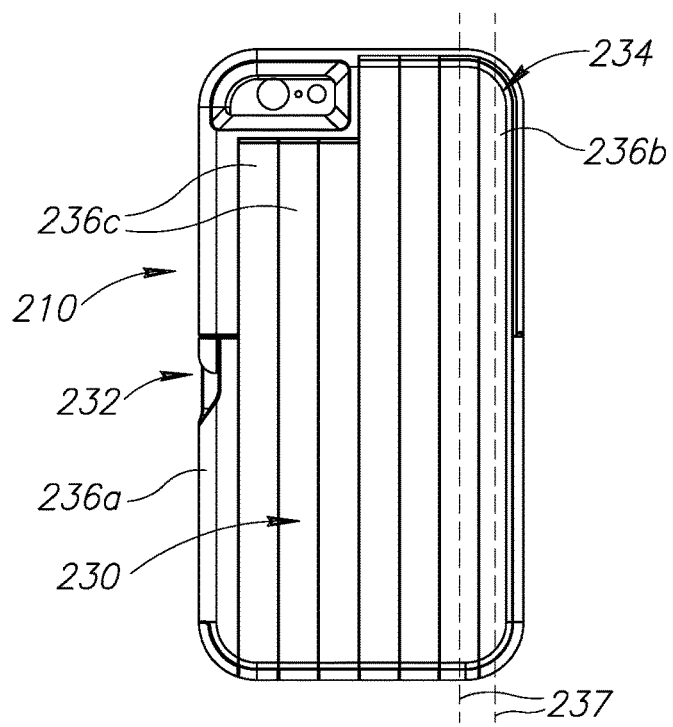
FIGS. 12A-12E are rear, front, left side, right side and bottom views of a transformable accessory for a handheld digital device, constructed in accordance with an additional embodiment of the present description, in a first operative position as a cover member for the digital device.
Figure 12C:
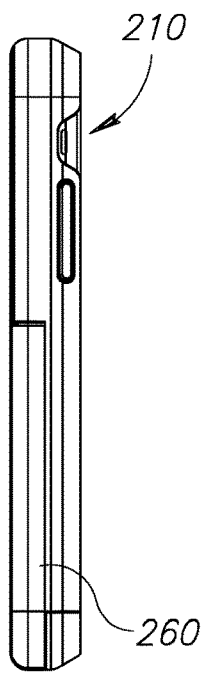
Figure 12B:
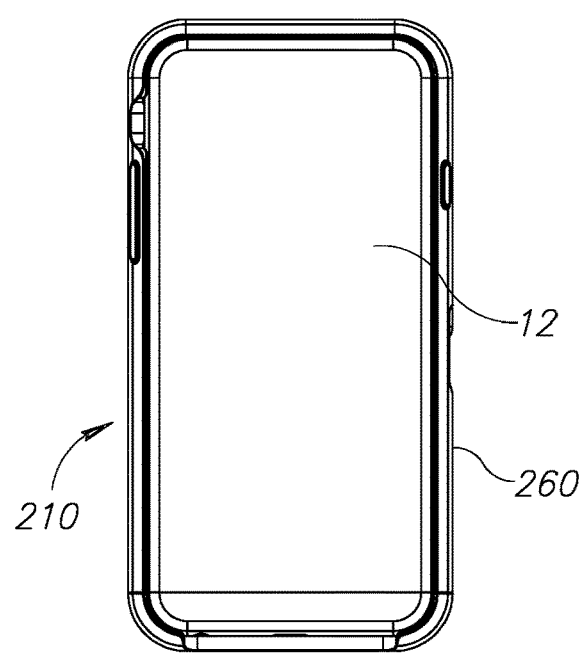
Figure 12D:
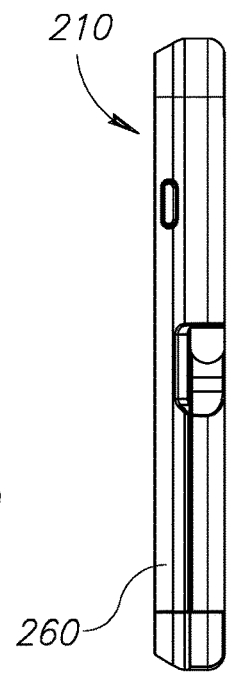
Figure 12E:
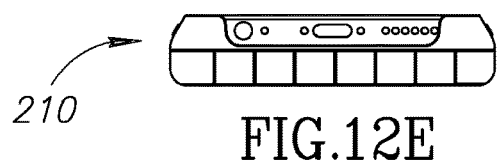

Accessory member 230 includes a plurality of parallel, interconnected elongate prismatic elements 236 configured for side by side substantially overlapping, coplanar arrangement when accessory member 230 is in its first operative position, as seen, inter alia, in FIG. 12A; and for side by side partially overlapping, coplanar arrangement when accessory member 230 is in its second operative position, as seen, inter alia, in FIG. 17A.

It is seen that each of the plurality of interconnected prismatic elements 236 is a linear element having a longitudinal axis 237 (FIGS. 12A and 13A), adapted for an axial sliding motion parallel to at least one other adjacent prismatic element 236. It will be appreciated that the axial sliding motion in a first direction causes extension of the accessory member 230, and that axially sliding the prismatic elements 236 in a second direction opposite to the first direction, causes retraction thereof.

Referring now to FIGS. 13A and 13B, it is seen that among the plurality of prismatic elements 236 are a first end element 236a terminating in the first end 232 of selfie stick rod 30, for engaging the mounting chassis 260; a second end element 236b terminating in the second end 234 of selfie stick rod 30, for being held in the hand of a user; and a plurality of interconnected intermediate elements 236c, connected to the first and second end elements 236a and 236b.

In the present example, each of the prismatic elements 236a, 236b and 236c (reference numeral 236 being used to denote each of these types of prismatic element unless stated otherwise), is formed to include a track 237 which faces laterally outwards in a first direction, towards an adjacent prismatic element 236. There is further provided a link element 239 which is formed on the opposite side of the prismatic element 236 relative to the track so as to extend laterally towards an adjacent prismatic element 236 in a second direction, opposite to the first direction.

As seen, each of the prismatic elements 236 is in interlocking, side by side, sliding engagement with one or more prismatic elements 236 by engagement of link element 239 along an adjacent track 237. In the present example, this sliding interlocking arrangement is achieved by providing the link element 239 with a cross-sectional profile so as to be widened at its free end 241, the widened portion 241 being adapted for sliding within a correspondingly widened inner portion 243 of track 237, and effectively confined therewithin. There is also provided, however, a stop member 245 which is fastened to an end 246 of prismatic element 236 so as to prevent link element 239 from sliding out of an engaged track 237 during extension of accessory member 230 and consequent disconnection of the individual prismatic elements 236.

It will be appreciated by persons skilled in the art that the length of selfie stick rod 230 is a function of the length and number of prismatic elements 236, which in turn is a function of their strength. In one example, selfie stick rod 230 is 71 cm in length, and its components may be made of different materials, including aluminum for tracks 237, plastic (nylon combined with glass fibers) for link elements 239, and plastic (ABS) for stop members 245. This is however merely one example, and other preferred materials may also be used.

Figure 16:
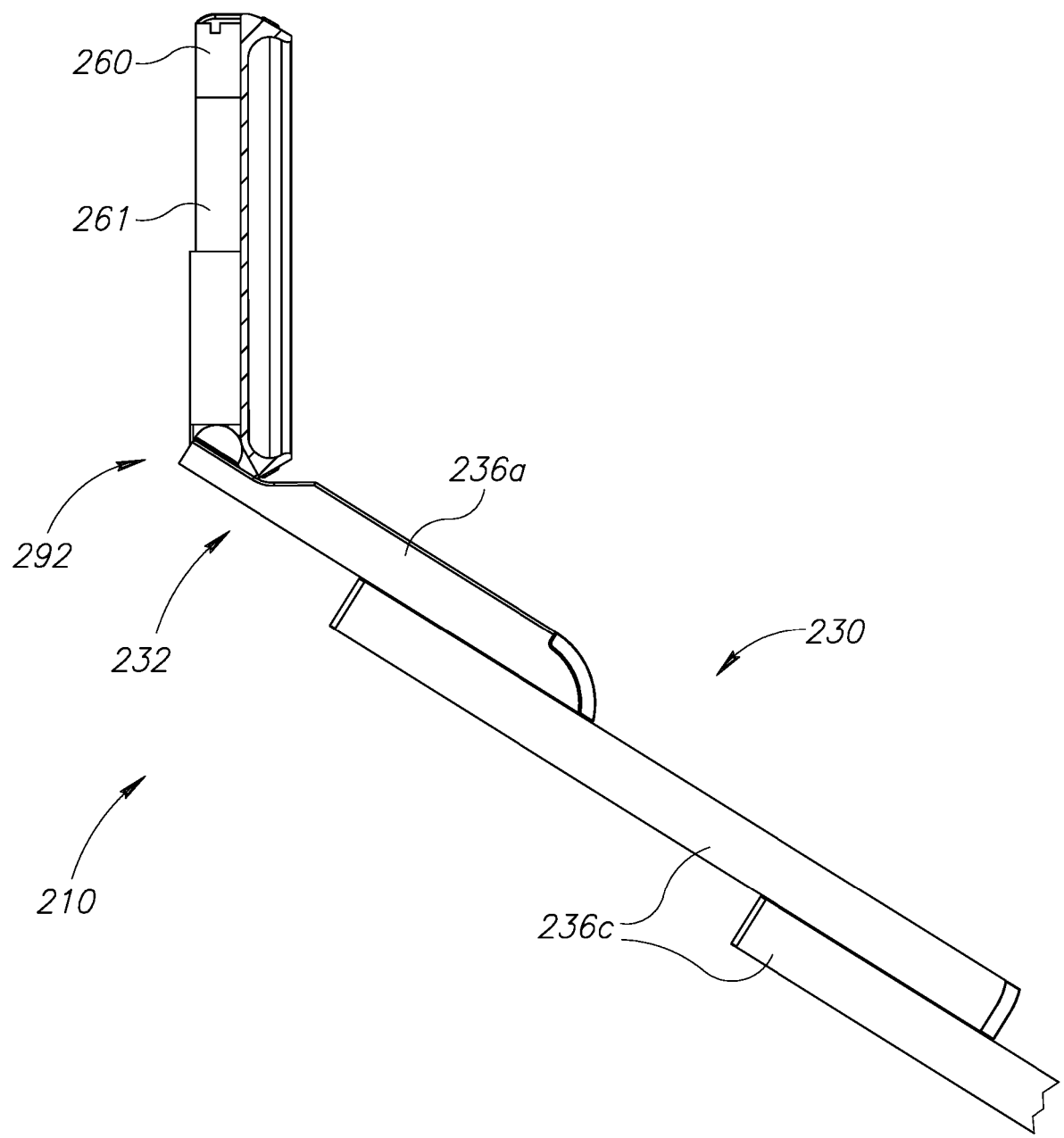
FIG. 16 is a cross-sectional side view of the accessory after transformation into a selfie stick.

Referring now briefly to FIGS. 16, 17A and 17B, the first end element 236 of selfie stick rod 230 is connected to the mounting chassis 260 via a hinge arrangement 292 having multiple degrees of freedom, which is adapted to permit a desired angular positioning of the mounting chassis 260 and thus device 12 with respect to each other, and typically in the illustrated, generally rearward position so as to face the user and thus permit a selfie photograph to be taken. It is however envisaged that other positions may also be desired, when seeking to use accessory 210 in order to photograph a target from a different angle and/or closer range than the user would be able to do without use thereof.

Figures 14A, 14B:
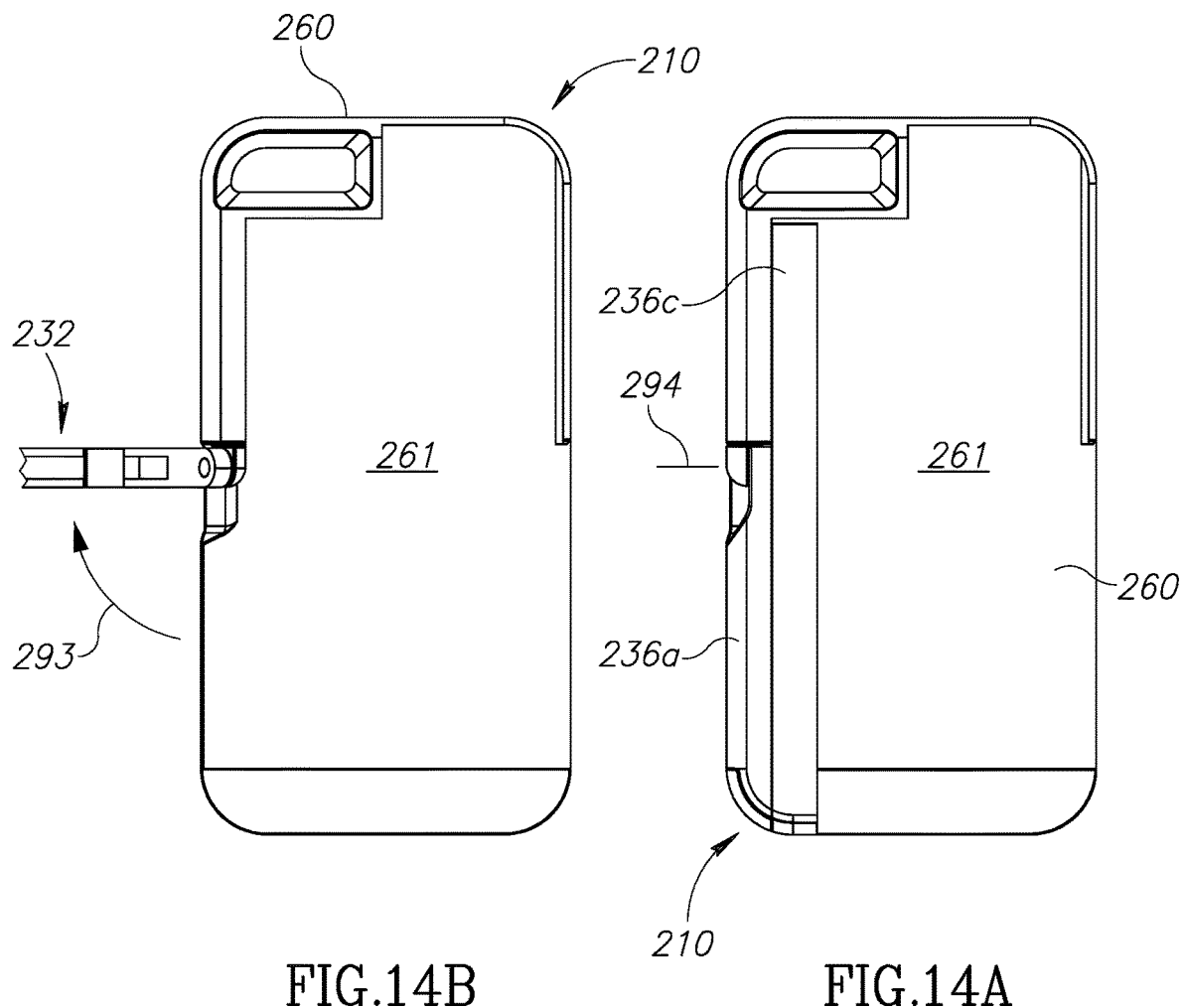
FIG. 14A is a rear view of the accessory, following extension of most of the rod, prior to a repositioning of the mounting chassis and device with respect to the rod.
FIG. 14B is a view similar to FIG. 14A, following complete transformation of the accessory into a selfie stick.

In accordance with one embodiment, hinge arrangement 292 may have a ball and socket type construction. The exploded view of FIG. 13B and the views of FIGS. 14A and 14B however illustrate a simple arrangement, having two degrees of freedom, in which there are seen a pair of mutually perpendicular joints enabling rotation of selfie stick rod 230 about in a first direction illustrated by first arrow 293 (FIG. 14B) about a first axis 294 (FIG. 14A), and then, as seen in FIG. 17B, in a second direction, illustrated by second arrow 295, about a second axis 296, wherein the first and second axes are mutually perpendicular.

Figure 18B:
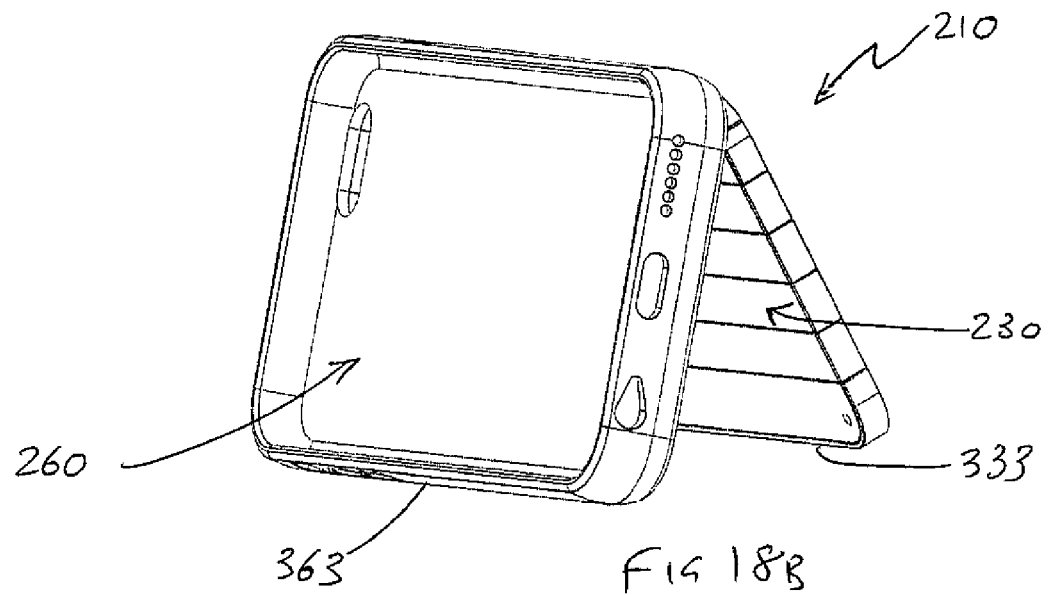
FIGS. 18A and 18B are pictorial views of the transformable accessory of FIGS. 12A-17B in use as a free standing support for a digital device in a landscape orientation.
Figure 18A:
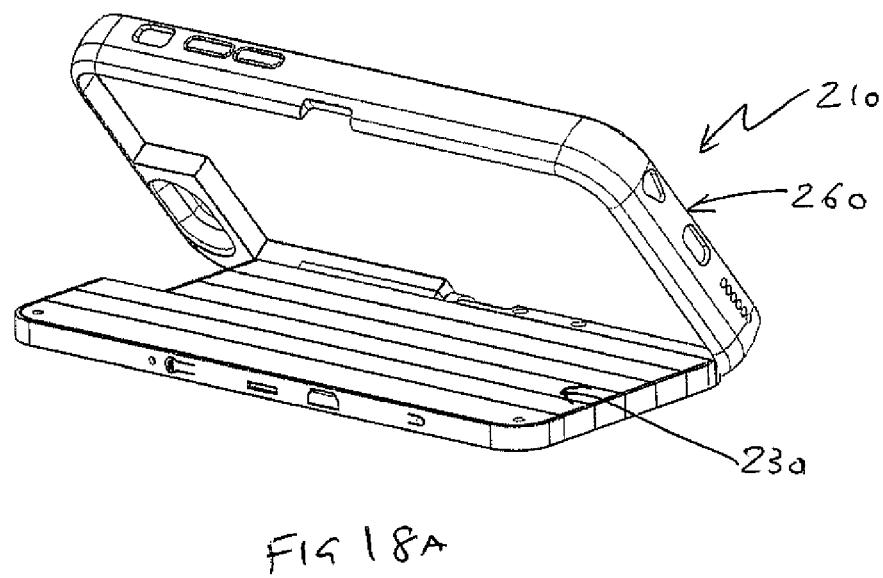

Referring now to FIGS. 18A, 18B and 19, it is seen that transformable accessory 210 may be used as a free standing support for a digital device (not shown) thereby, at a preferred angle with respect to a horizontal surface for the purpose of viewing the digital device display without having to hold it or for taking selfie pictures without needing the hold the device.

In FIG. 18A, accessory 210 is seen to be resting on an outward-facing surface of accessory member 230 when functioning as a cover member in a horizontal or landscape orientation. In contrast thereto, FIG. 18B shows accessory 210 when resting on long side edges 333 and 363 of accessory member 230 and mounting chassis 260, respectively, but also in a horizontal or landscape orientation.

FIG. 19 shows accessory 210 to be supporting a digital device (not shown) in a vertical or portrait orientation, wherein accessory member 230 is angled open with respect to the mounting chassis 260 and the accessory 210 is standing on short end edges 335 and 365 of accessory member 230 and mounting chassis 260, respectively.

In a further embodiment of the invention, there may be provided a storage compartment 336 and/or or 366 in either one or both of the opposing, inward-facing sides 337 and 367, respectively, of a rear panel 339 of the accessory member 230 in its cover member configuration, or of mounting chassis 260. The storage compartments are typically shallow, and have the shape of a credit card, although they may alternatively be of any useful shape so as to obviate the need to carry such items separately, in a wallet or purse.

It will be appreciated by persons skilled in the art that the present invention is not limited by what has been shown and described hereinabove, merely by way of non-limiting example. Rather, the scope of the invention is defined solely by the claims, which follow.

We claim:

1. An electronic device comprising:
a display screen configured to display an image;

a housing comprising a frame, and a rear part connected to a rear surface of the frame, wherein the frame includes a battery mounting structure forming a space where a battery is mountable;
a display tape adhering a rear surface of the display screen to a front surface of the frame; a battery mounted in the space of the battery mounting structure; a battery tape adhering the battery mounting structure to the battery; a chamber adjacent to the battery that is disposed between opposite facing surfaces of the display tape and the battery; and
an air path connecting the chamber to another space in the electronic device,
wherein the battery mounting structure includes a mounting plate forming an opening that exposes at least one portion of a front surface of the battery,
wherein the chamber is formed by the at least one portion of a front surface of the battery exposed by the opening and the display tape, and
wherein a portion of the frame is directly sandwiched between a portion of the battery tape and a portion of the display tape, the portion of the frame being along a side of the chamber.

2. The transformable accessory according to claim 1, wherein said plurality of interconnected elongate, prismatic elements are foldable with respect to one another.

3. The transformable accessory according to claim 1, wherein each of said plurality of interconnected elongate prismatic elements is adapted for an axial sliding motion along at least one other adjacent prismatic element, said axial sliding motion in a first direction being required so as to achieve transformation of said accessory member into said rod, and further, in a second direction opposite to said first direction, so as to achieve transformation of said rod back into said cover portion.

4. The transformable accessory according to claim 3, wherein said plurality of interconnected elongate, prismatic elements include:
a first end element terminating in said first end for engaging the digital device;
a second end element terminating in said second, free end for being held in the hand of a user; and
a plurality of interconnected intermediate elements connected to said first and said second end elements.

5. The transformable accessory according to claim 4, wherein each of said elongate, prismatic elements is adjacent to and operative for interlocking engagement with and side by side sliding along at least one other of said plurality of interconnected elongate, prismatic elements.

6. The transformable accessory according to claim 5, wherein each said intermediate element is adjacent to and operative for interlocking engagement with and side by side sliding along two of said plurality of interconnected elongate, prismatic elements.

7. The transformable accessory according to claim 6, wherein each said elongate, prismatic element includes:
a track configured to face laterally towards an adjacent elongate, prismatic element in a first direction,
a link element formed on the opposite side of said elongate, prismatic element relative to said track so as to extend towards an adjacent elongate, prismatic element in a second direction, opposite to said first direction, wherein said link element of one elongate, prismatic element is adapted to engage said track of an adjacent element so as to be slidably movable therealong; and
a stop element provided at the end of said track so as to prevent disconnection of said link element from said track of said adjacent element.

8. The transformable accessory according to claim 4, wherein said first end element is connected to said mounting chassis via a hinge arrangement having multiple degrees of freedom so as to facilitate a desired angular adjustment of said mounting chassis and the digital device relative to said accessory member.

9. The transformable accessory according to claim 8, wherein said hinge arrangement has at least two degrees of freedom.

10. The transformable accessory according to claim 9, wherein said remotely located control is mounted at the second, free end of said rod.

11. The transformable accessory according to claim 10 wherein said accessory member is connected to said mounting chassis via a hinge so as to be unitarily foldable with respect thereto.

12. The transformable accessory according to claim 11, wherein said accessory member may be partially folded about said hinge into an open position with respect to said mounting chassis so as to be usable as a free standing support for a digital device.

13. The transformable accessory according to claim 12, wherein said free standing support may be used so as to position the digital device in either a portrait or landscape orientation.

14. The transformable accessory according to claim 11, wherein said mounting chassis also includes an interior rear panel formed integrally with said edge portion and interposed between said accessory member and the rear of the digital device.

15. The transformable accessory according to claim 14, wherein at least one of said accessory member and said interior rear panel is formed so as to define a storage space therebetween when said accessory member is folded closed with respect to said interior rear panel.

16. The transformable accessory according to claim 1, wherein each of said plurality of interconnected elongate, prismatic elements is a linear element having a longitudinal axis.

17. The transformable accessory according to claim 1, also including a remotely located control for operating the digital device.

18. A transformable accessory for a handheld digital device, the accessory including:
a mounting chassis adapted for securing to a digital device; and
an accessory member connected to said mounting chassis transformable between first and second operative positions, having a plurality of interconnected elongate, prismatic elements,
in said first operative position said plurality of interconnected elongate, prismatic elements being locked in a side by side, coplanar formation thereby to extend across the rear of said mounting chassis so as to cooperate with said mounting chassis as a protective cover for the digital device, and
in said second operative position, said plurality of interconnected elongate, prismatic elements extendable into a rod which has a first end connected to said mounting chassis and a second, free end, the combination of the rod and the mounting chassis operating as a selfie stick for the digital device; and
wherein each of said plurality of interconnected elongate prismatic elements is adapted for an axial sliding motion along at least one other adjacent prismatic element, said axial sliding motion in a first direction being required so as to achieve transformation of said accessory member into said rod, and further, in a second direction opposite to said first direction, so as to achieve transformation of said rod back into the protective cover.

19. A transformable accessory for a handheld digital device, the accessory including:
   a mounting chassis adapted for securing to a digital device; and
   an accessory member connected to said mounting chassis transformable between first and second operative positions, having a plurality of interconnected elongate, prismatic elements, adapted for a translational axial sliding motion along at least one other adjacent prismatic element,
   in said first operative position said plurality of interconnected elongate, prismatic elements being locked in a side by side, coplanar formation thereby to extend across the rear of said mounting chassis so as to cooperate with said mounting chassis as a protective cover for the digital device, and
   in said second operative position, said plurality of interconnected elongate, prismatic elements extendable into a rod which has a first end connected to said mounting chassis and a second, free end, the combination of the rod and the mounting chassis operating as a selfie stick for the digital device; and
   wherein said axial sliding motion in a first direction being required so as to achieve transformation of said accessory member into said rod, and further, in a second direction opposite to said first direction, so as to achieve transformation of said rod back into the protective cover.

* * * * *